United States Patent
Shinya

(10) Patent No.: US 7,983,659 B2
(45) Date of Patent: Jul. 19, 2011

(54) INFORMATION DELIVERY APPARATUS AND INFORMATION DELIVERY SYSTEM

(75) Inventor: Tadashi Shinya, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 748 days.

(21) Appl. No.: 11/920,068

(22) PCT Filed: Mar. 20, 2006

(86) PCT No.: PCT/JP2006/305508
§ 371 (c)(1),
(2), (4) Date: Nov. 8, 2007

(87) PCT Pub. No.: WO2006/120802
PCT Pub. Date: Nov. 16, 2006

(65) Prior Publication Data
US 2009/0098821 A1    Apr. 16, 2009

(30) Foreign Application Priority Data
May 13, 2005 (JP) ................................. 2005-141495

(51) Int. Cl.
*H04M 3/42* (2006.01)
(52) U.S. Cl. ............... 455/414.1; 455/432.1; 455/456.1; 455/456.2; 455/456.3; 455/456.5; 455/456.6
(58) Field of Classification Search ............... 455/414.1, 455/432.1, 456–456.6, 466; 370/310, 310.2, 370/328
See application file for complete search history.

(56) References Cited

U.S. PATENT DOCUMENTS

| | | | | |
|---|---|---|---|---|
| 5,774,874 A | * | 6/1998 | Veeneman et al. | 705/27 |
| 6,647,257 B2 | * | 11/2003 | Owensby | 455/414.1 |
| 6,873,967 B1 | * | 3/2005 | Kalagnanam et al. | 705/26 |
| 6,970,871 B1 | * | 11/2005 | Rayburn | 1/1 |
| 7,522,634 B2 | * | 4/2009 | Casey et al. | 370/468 |
| 2003/0216176 A1 | | 11/2003 | Shimizu et al. | |

FOREIGN PATENT DOCUMENTS

| | | |
|---|---|---|
| JP | 08-241257 | 9/1996 |
| JP | 08-249307 | 9/1996 |
| JP | 2003-006512 | 1/2003 |
| JP | 2003-334379 | 1/2003 |
| JP | 2004-252494 | 9/2004 |
| WO | WO 03/009176 A1 | 1/2003 |

* cited by examiner

*Primary Examiner* — Stephen M D'Agosta
(74) *Attorney, Agent, or Firm* — Muirhead and Saturnelli, LLC

(57) ABSTRACT

An information delivery system of the present invention includes mobile communication terminals and an information delivery apparatus. The information delivery apparatus selectively delivers information to the mobile communication terminals via a communication network, and includes delivery information memory means, location history information memory means, delivery information selecting means, and information transmitting means. The location history information memory means memorizes location history information showing locations where a mobile communication terminal was located in the past. The delivery information selecting means selects delivery information to be transmitted to the mobile communication terminal according to predetermined selection conditions based on the location history information read out from the location history information memory means. The information transmitting means transmits the delivery information selected by the delivery information selecting means to the mobile communication terminal.

17 Claims, 21 Drawing Sheets

[Fig. 1]
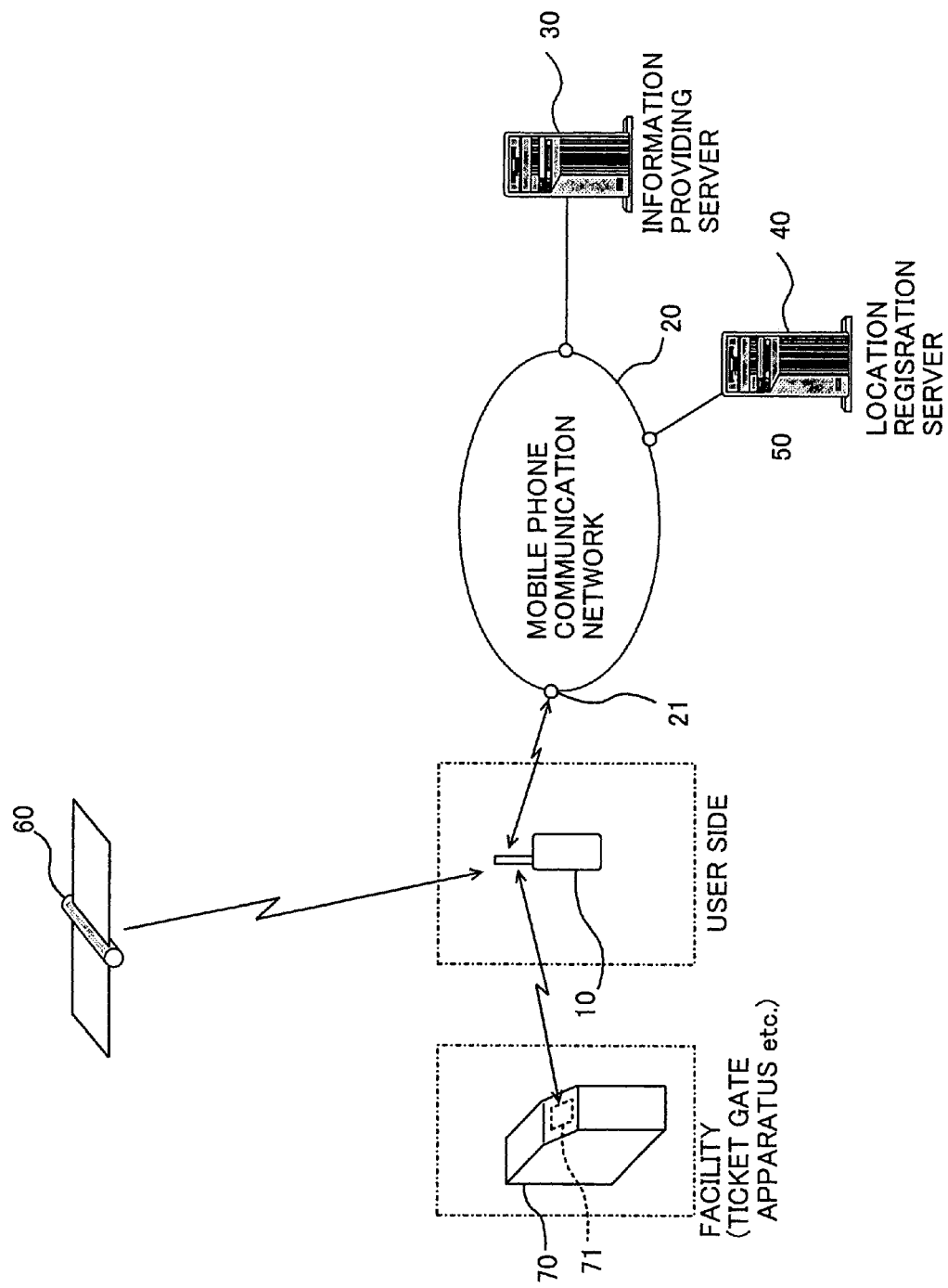

[Fig. 2]
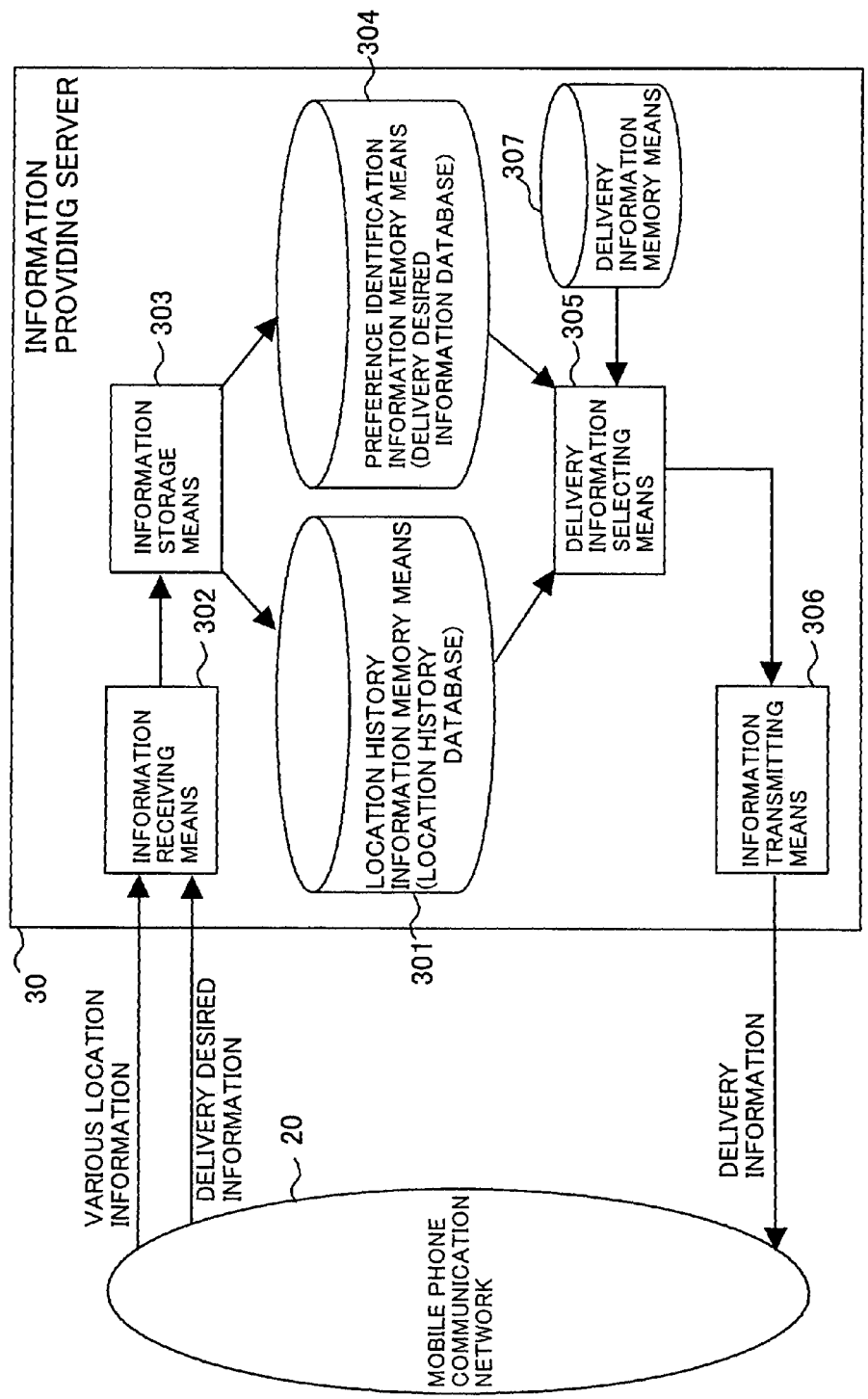

[Fig. 3]
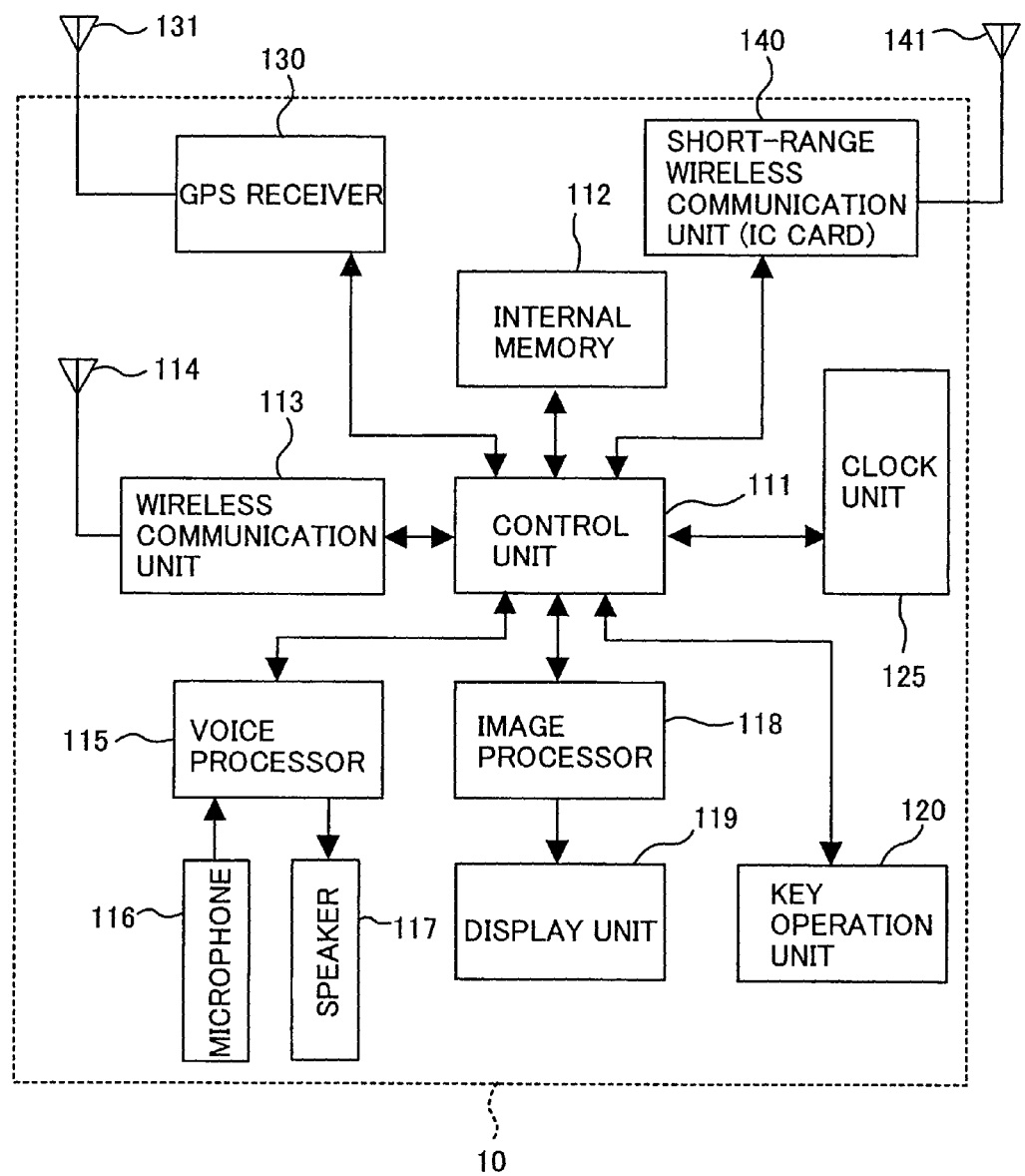

[Fig. 4]
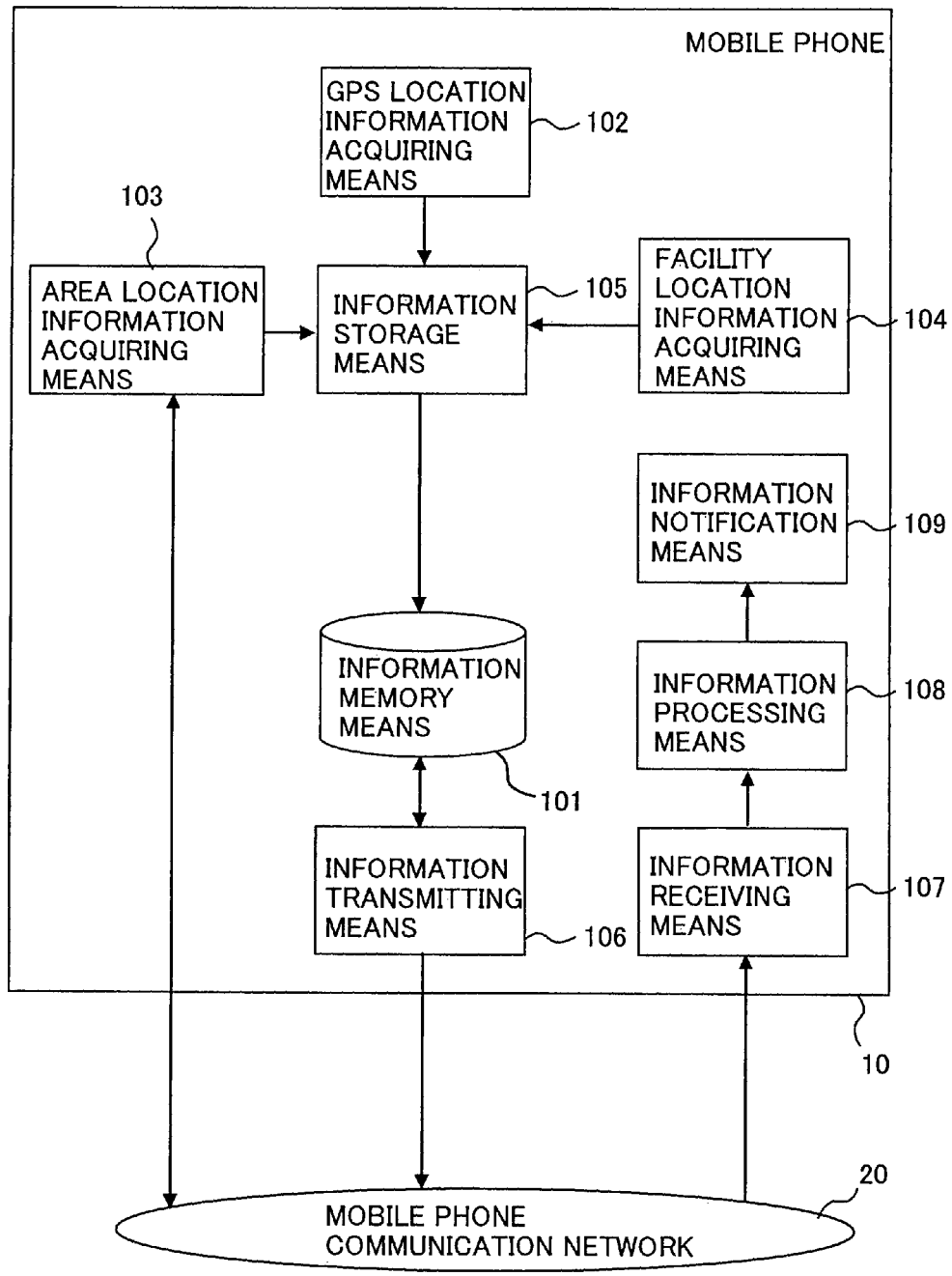

[Fig. 5]
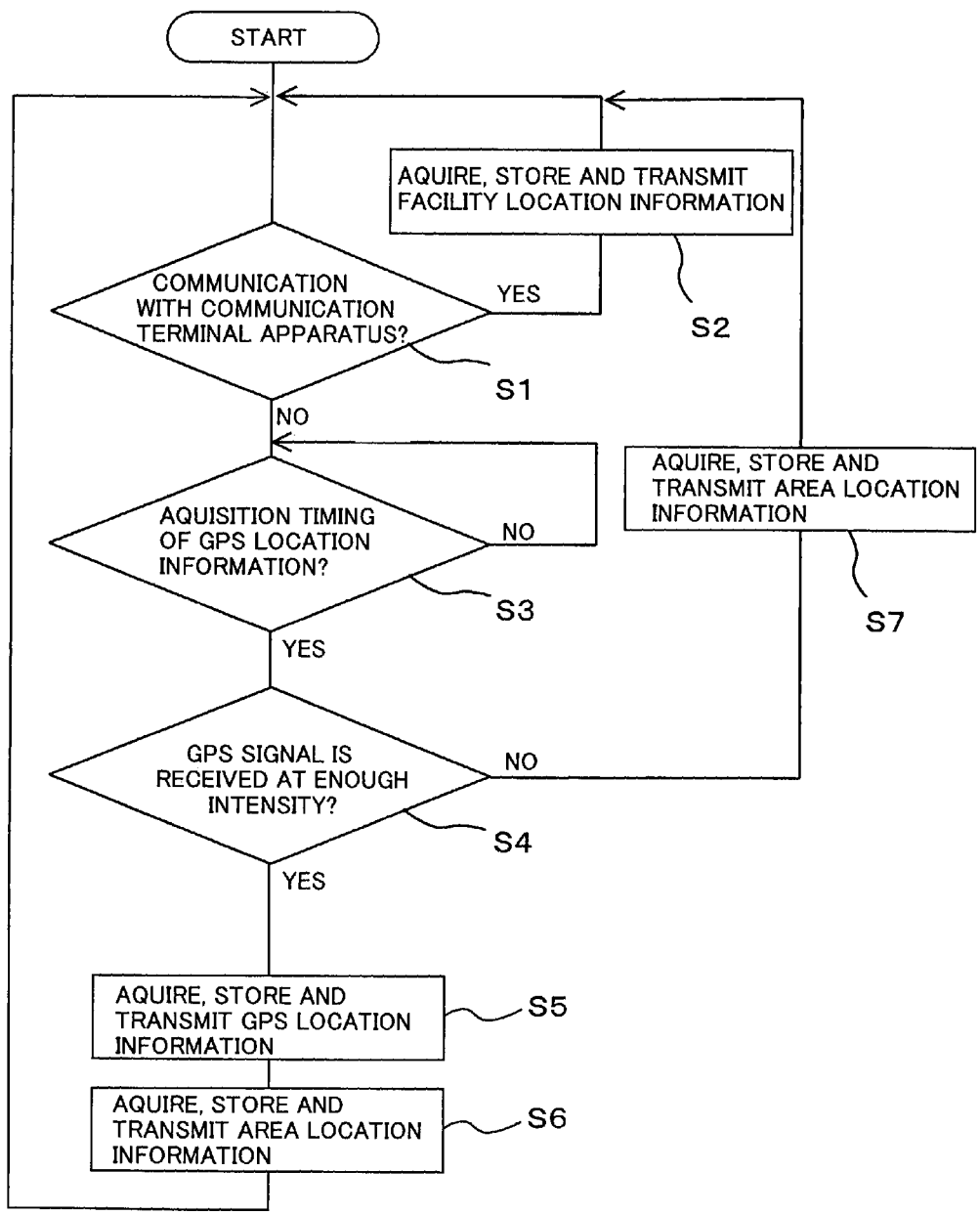

[Fig. 6]
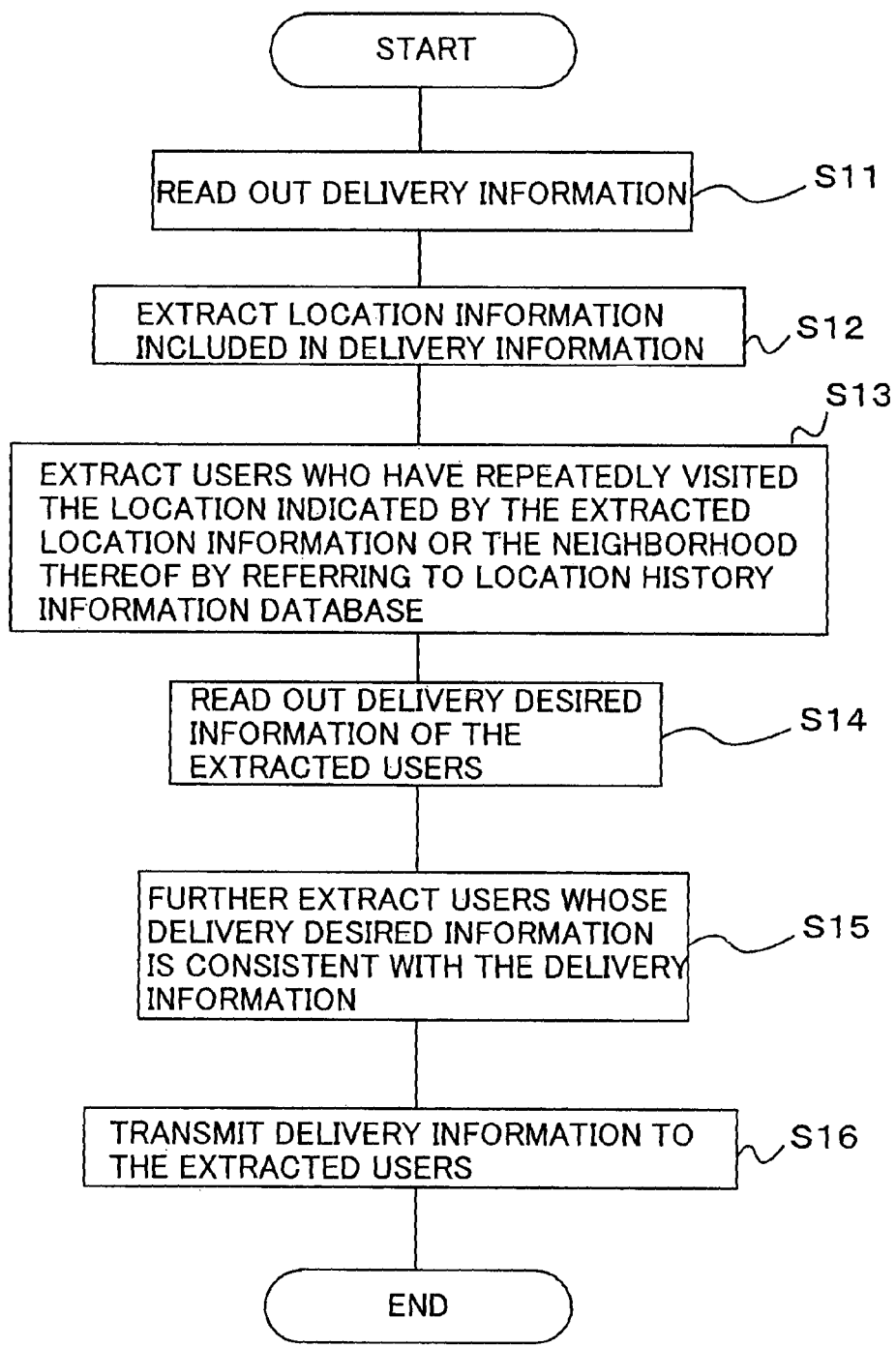

[Fig. 7]
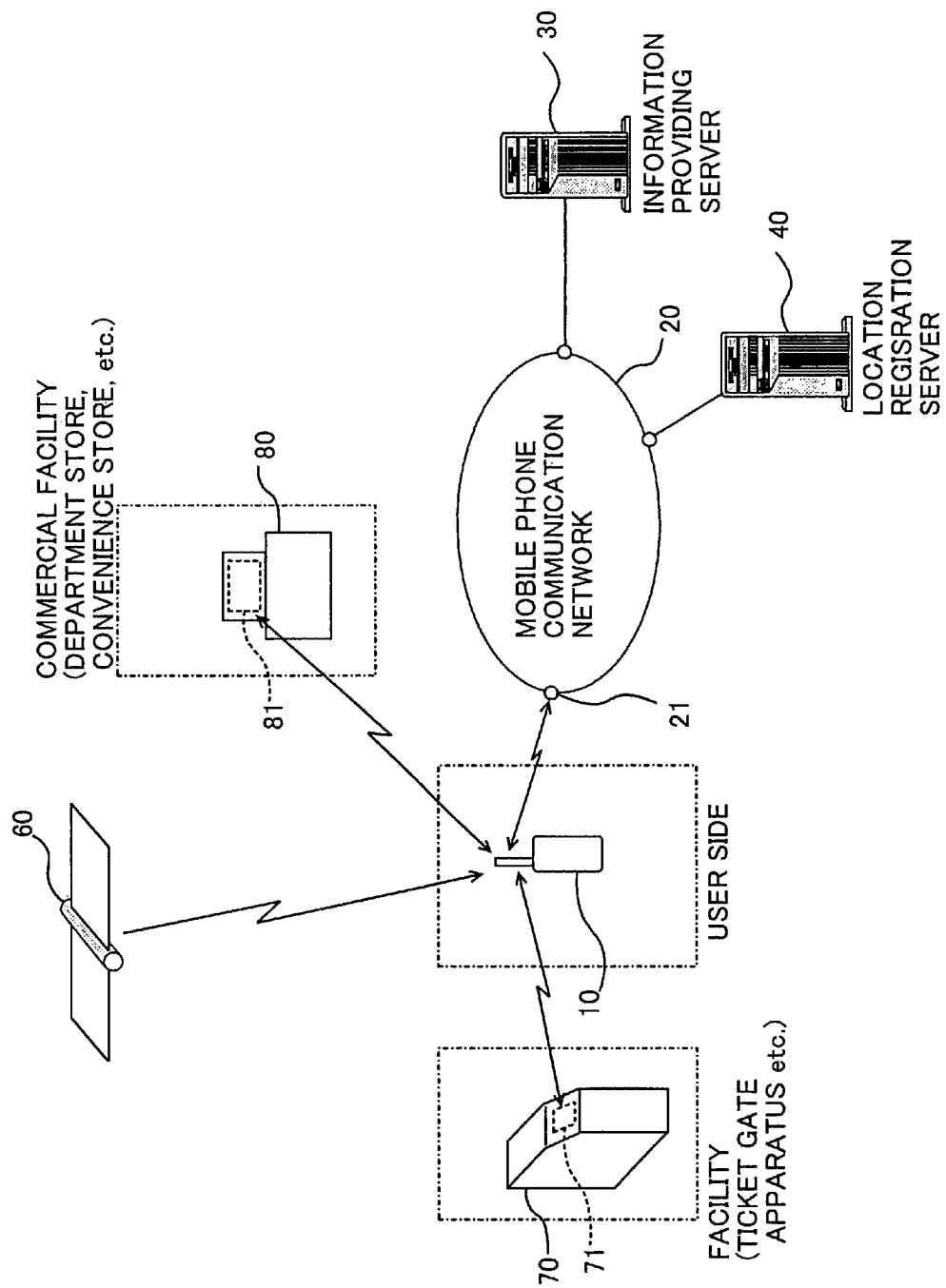

[Fig. 8]
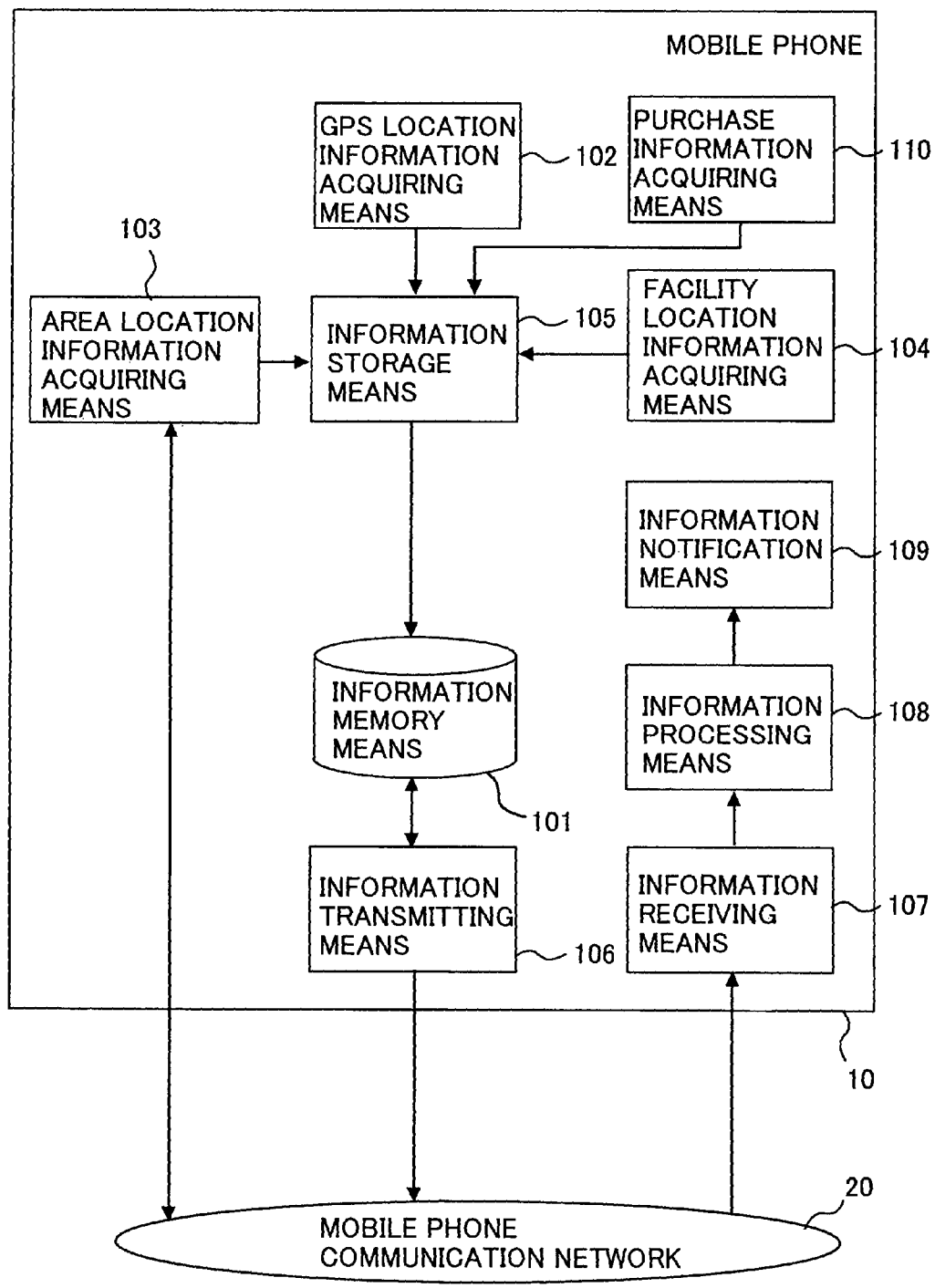

[Fig. 9]
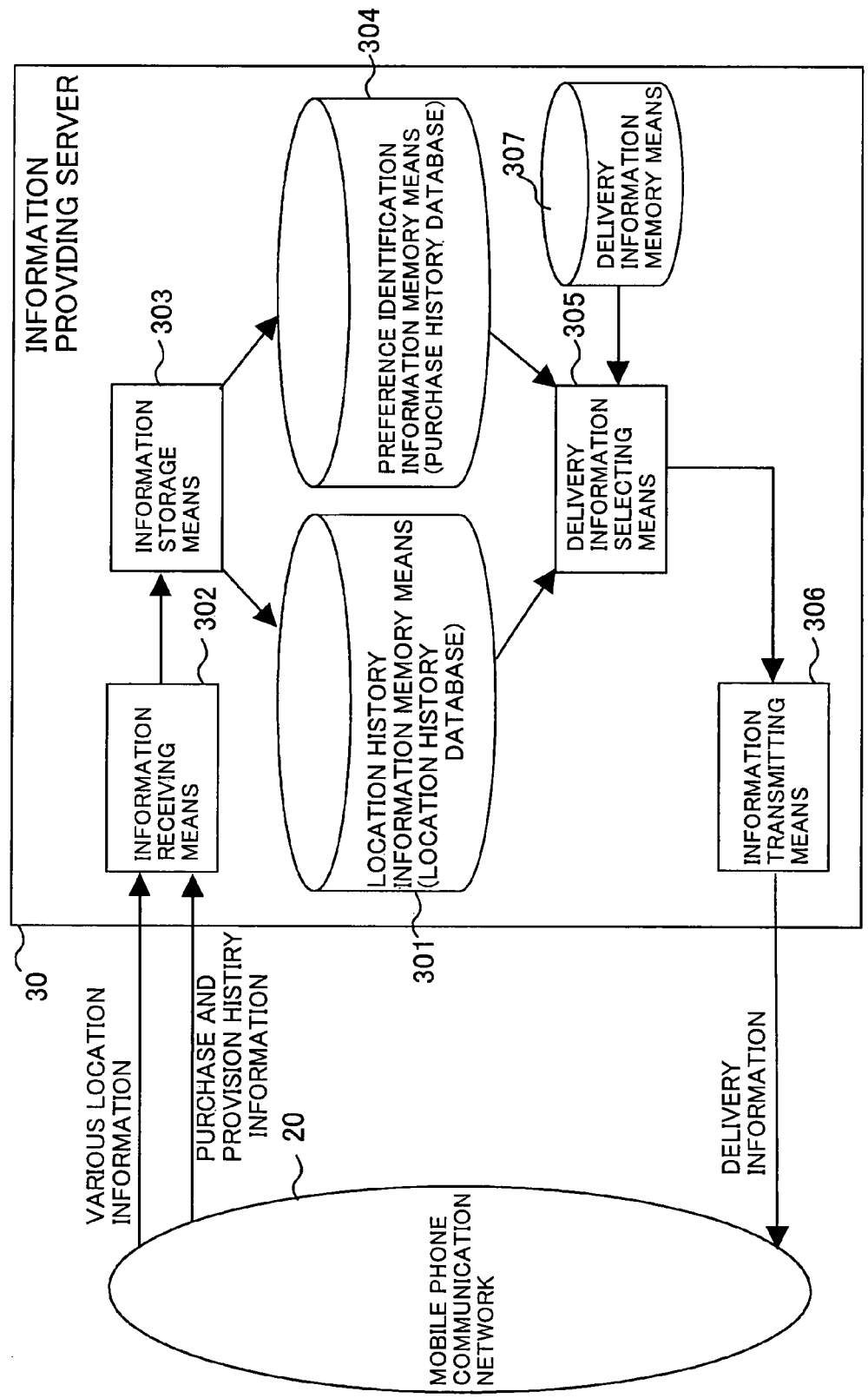

[Fig. 10]
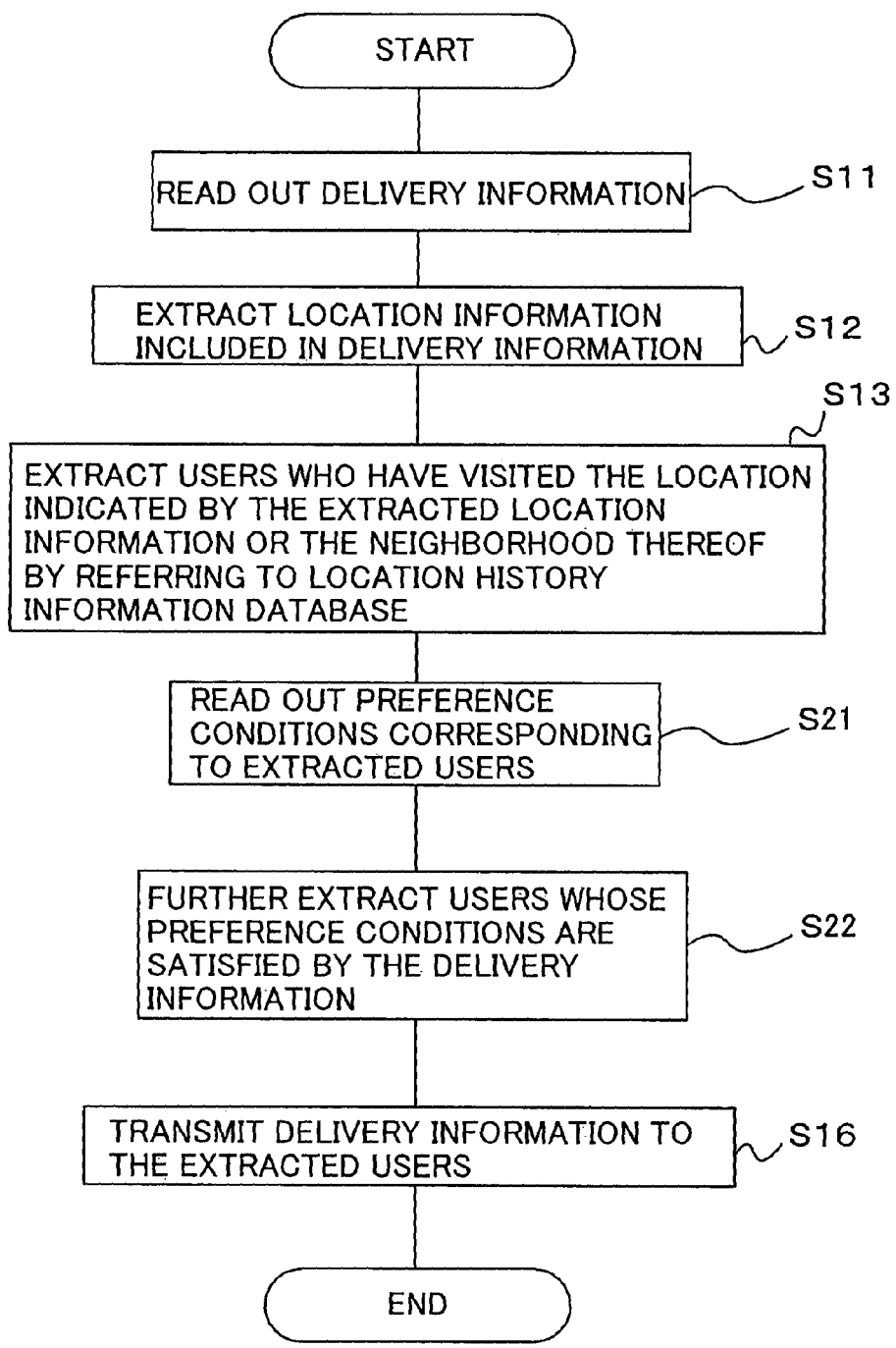

[Fig. 11]
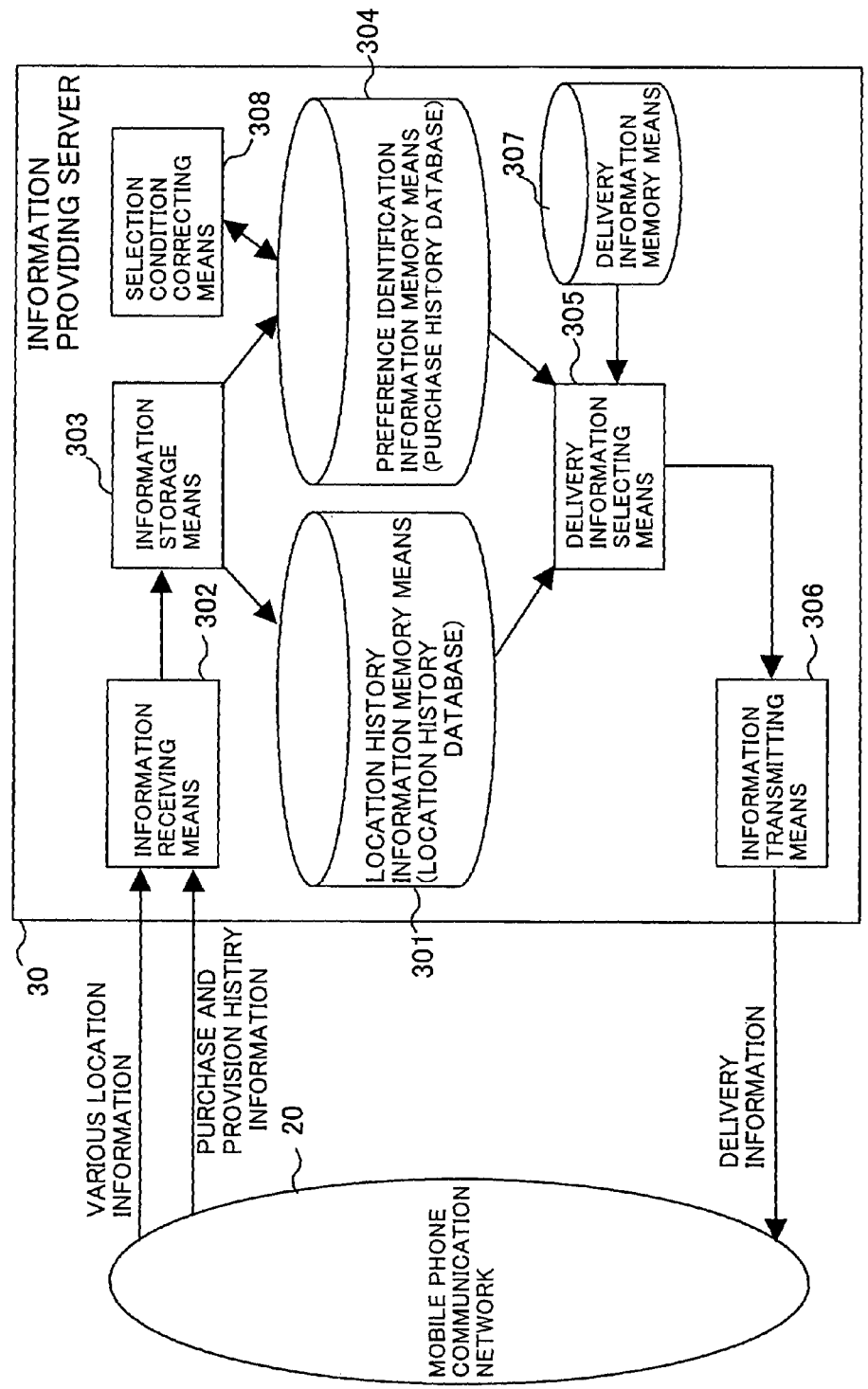

[Fig. 12]
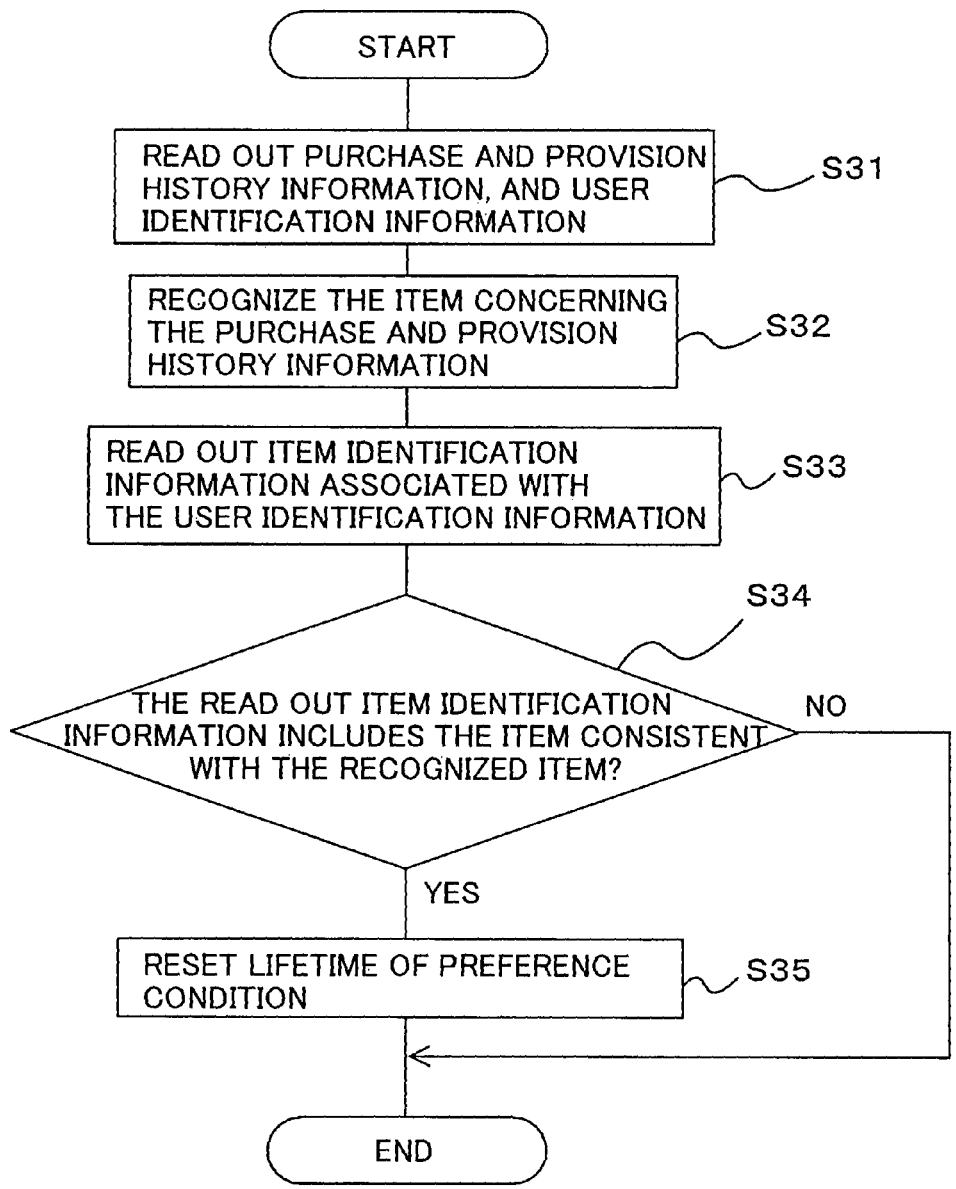

[Fig. 13]
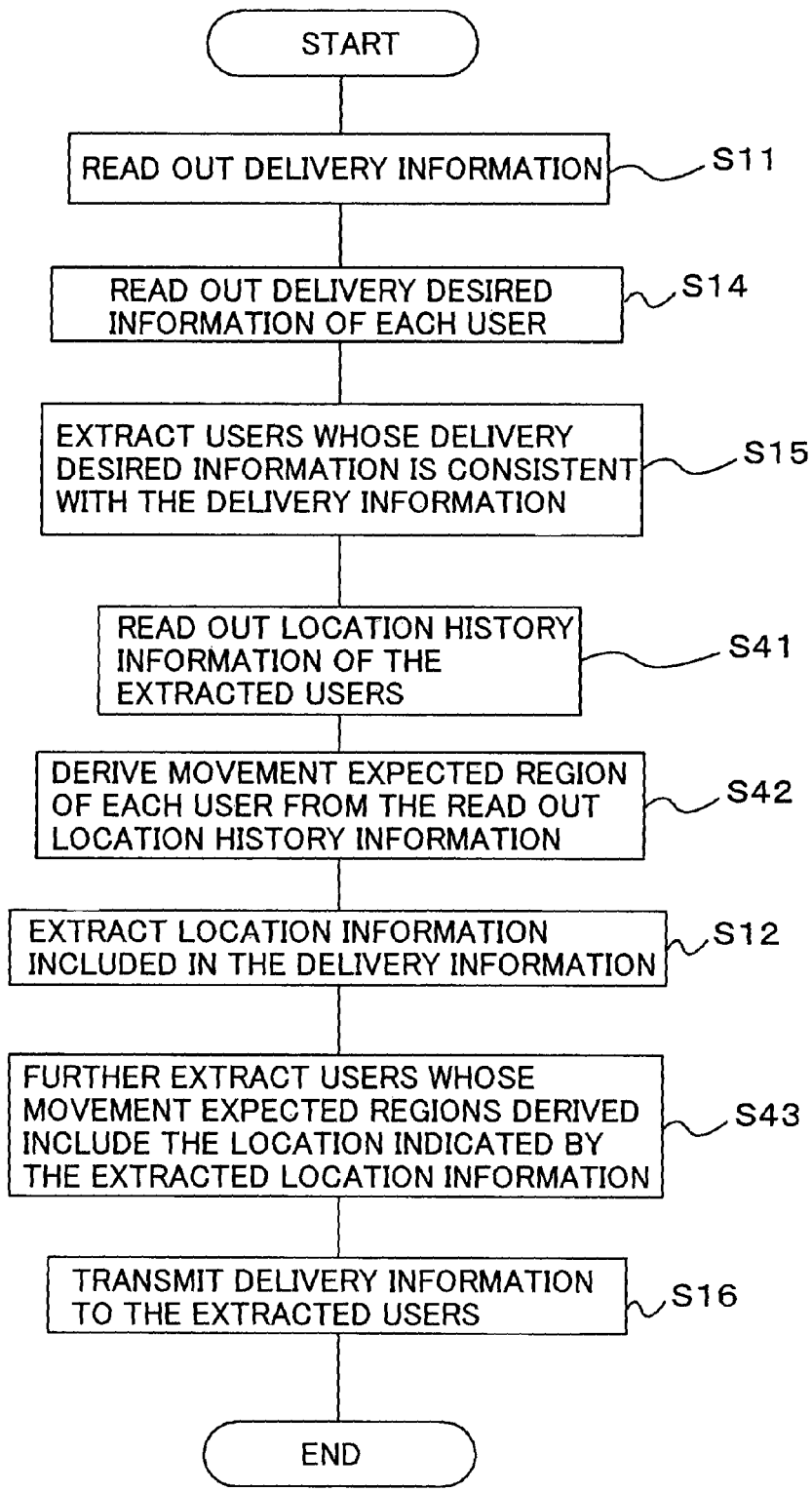

[Fig. 14]
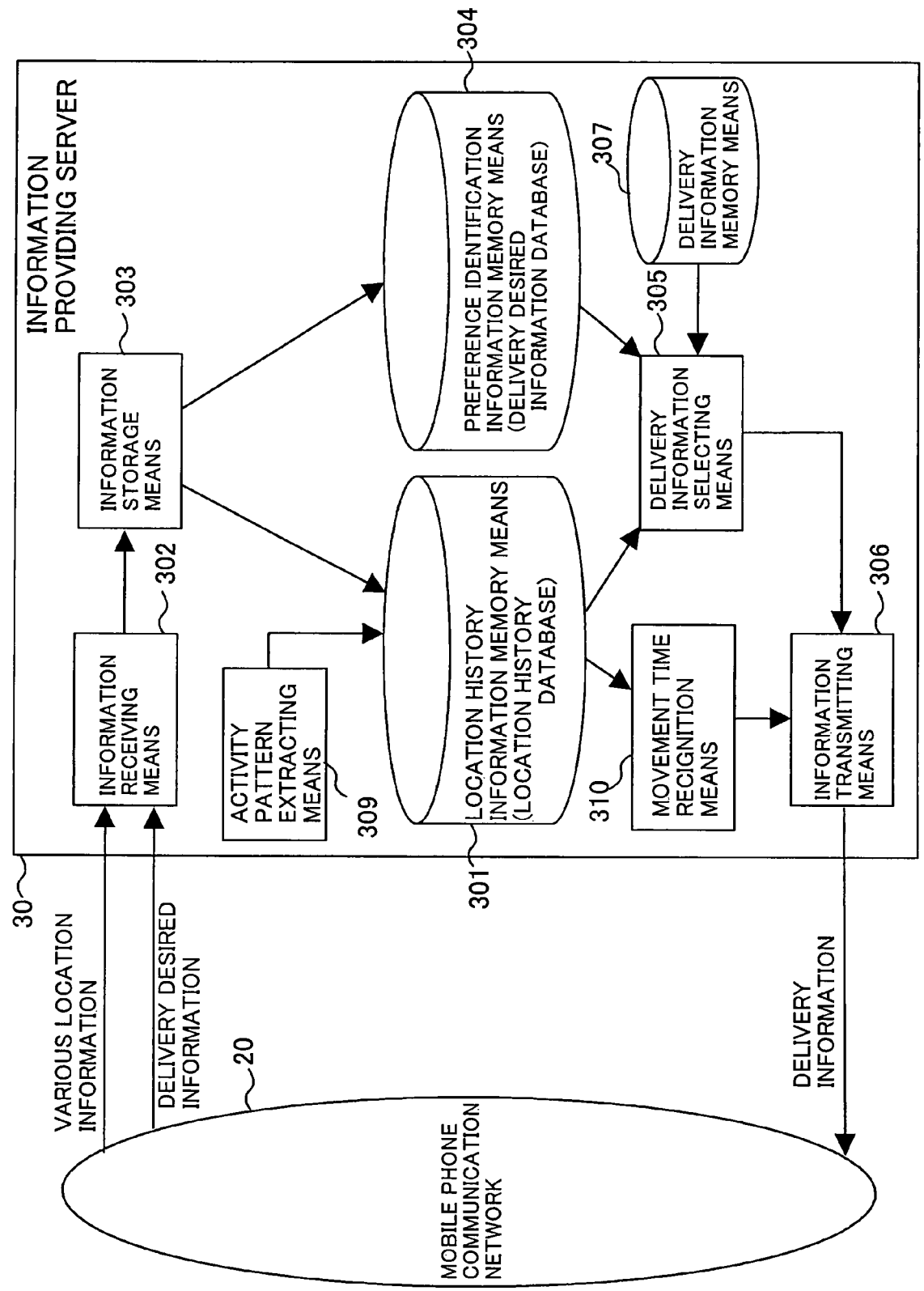

[Fig. 15]
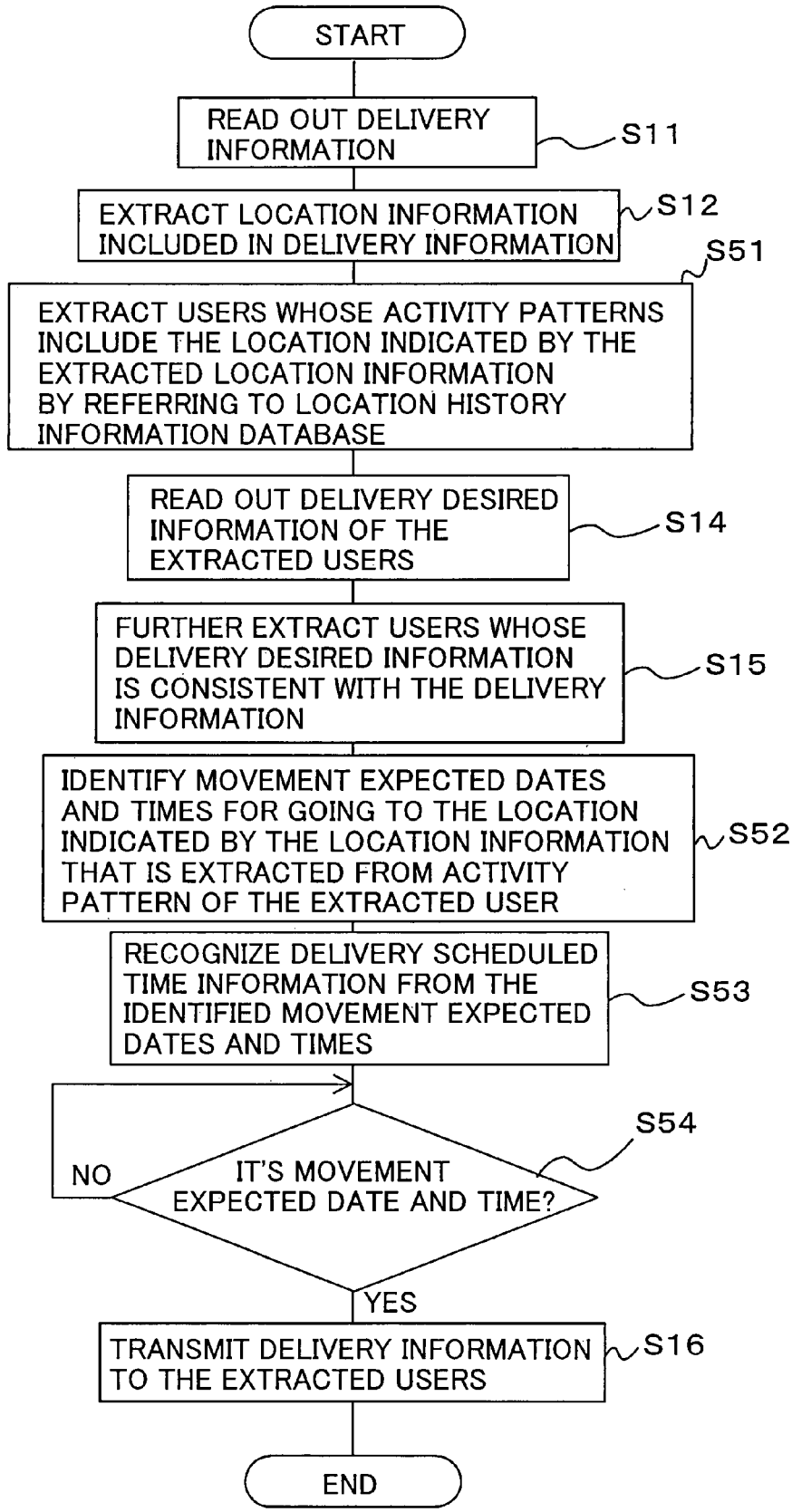

[Fig. 16]
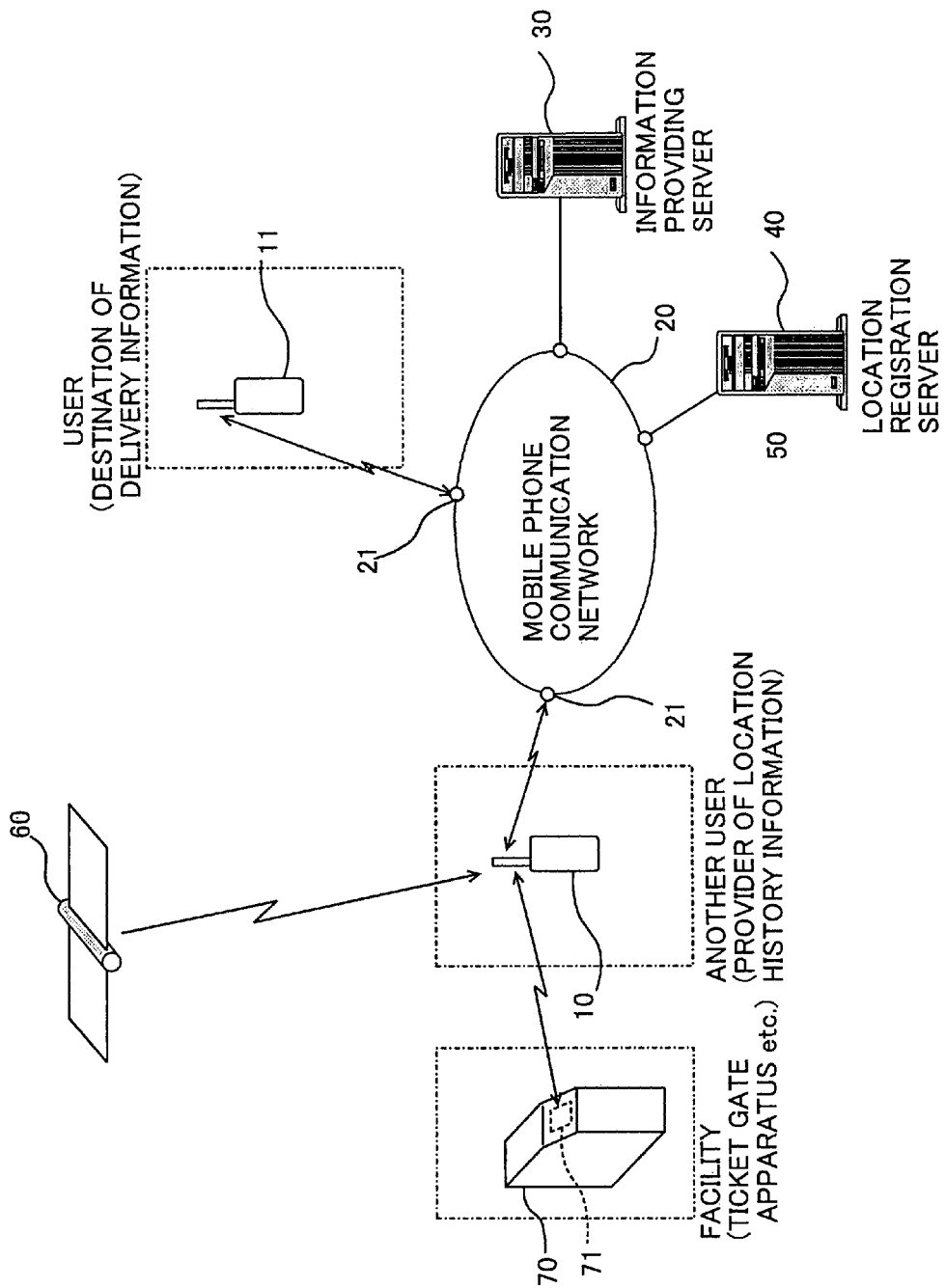

[Fig. 17]
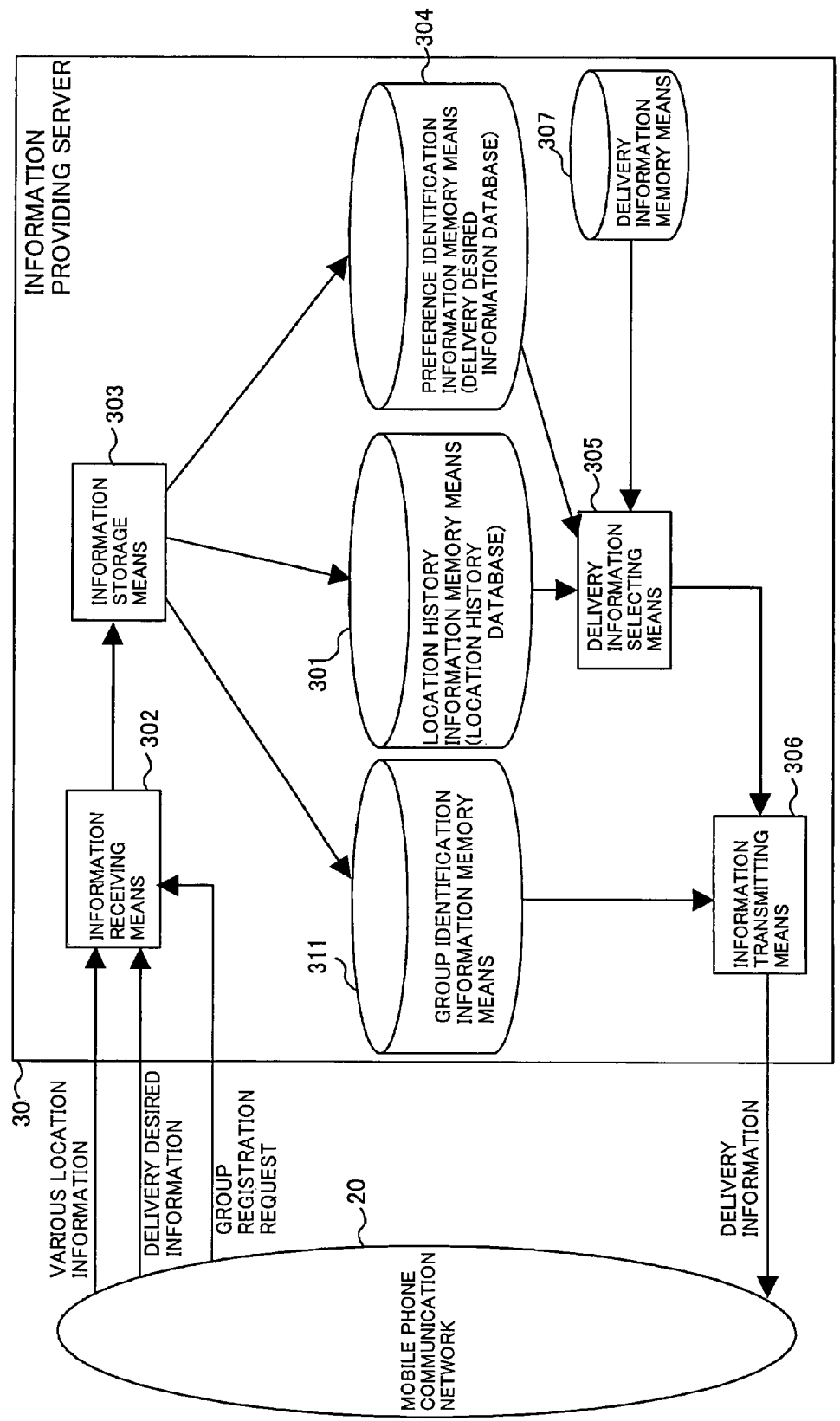

[Fig. 18]
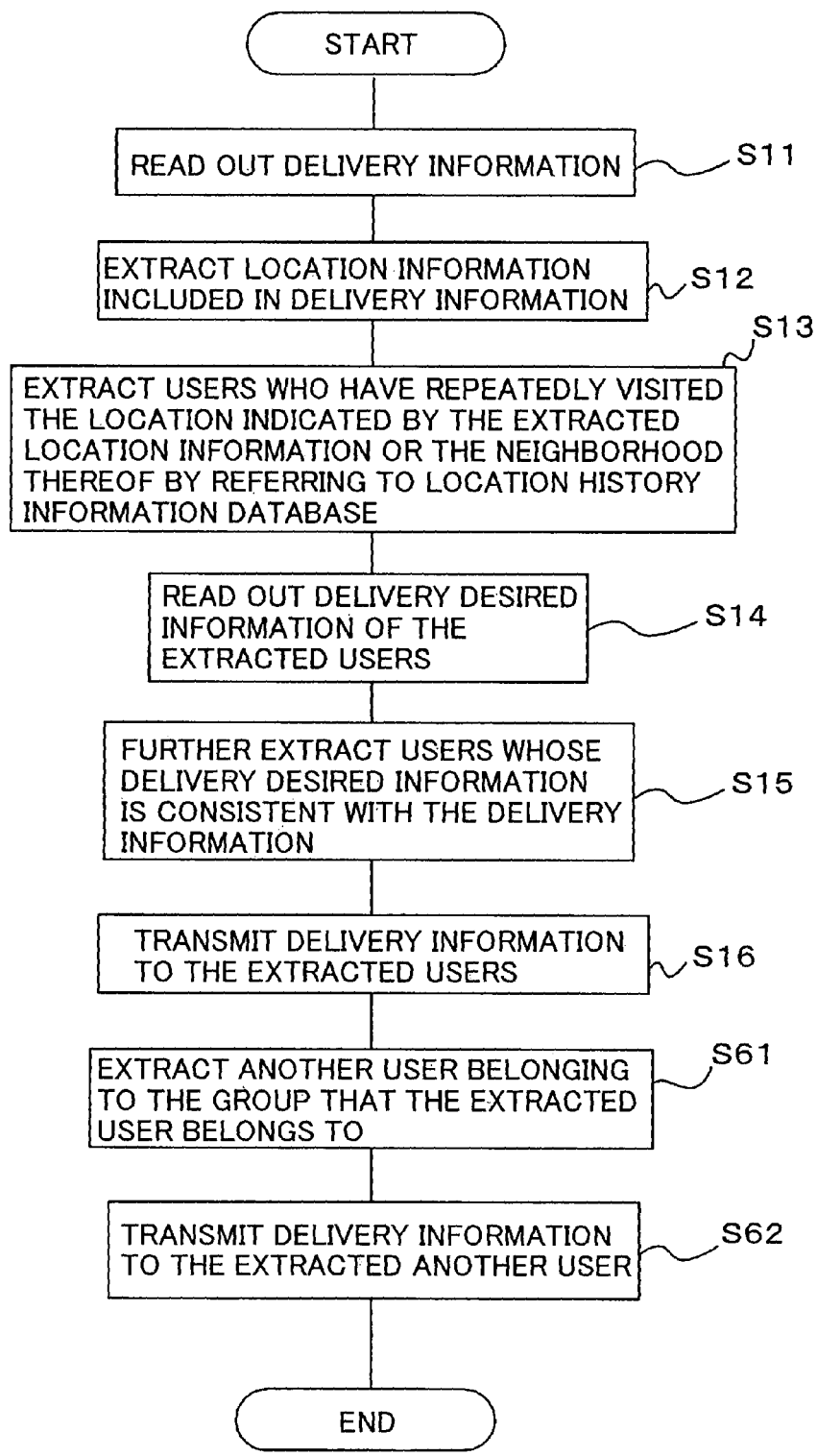

[Fig. 19]
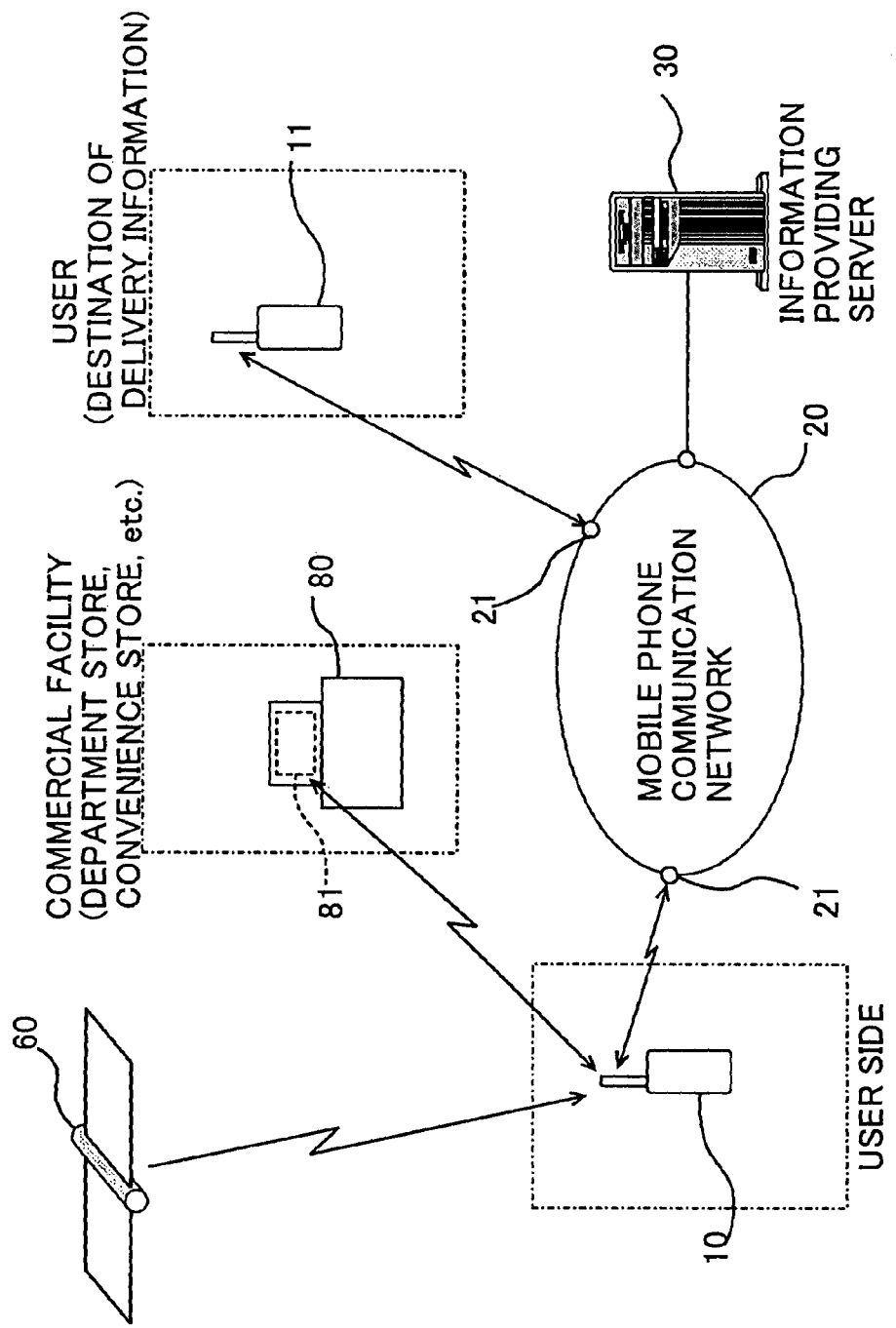

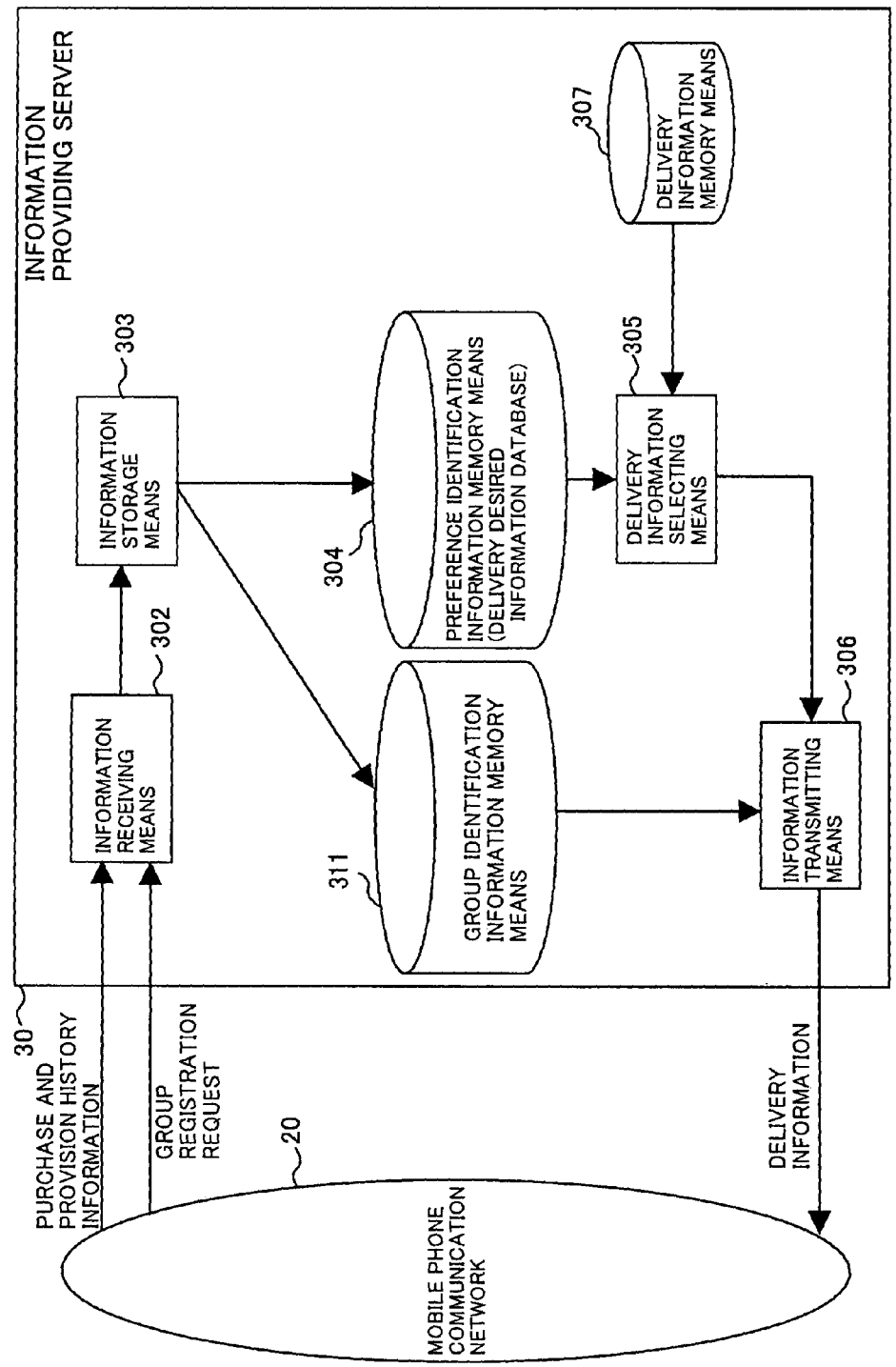
[Fig. 20]

[Fig. 21]
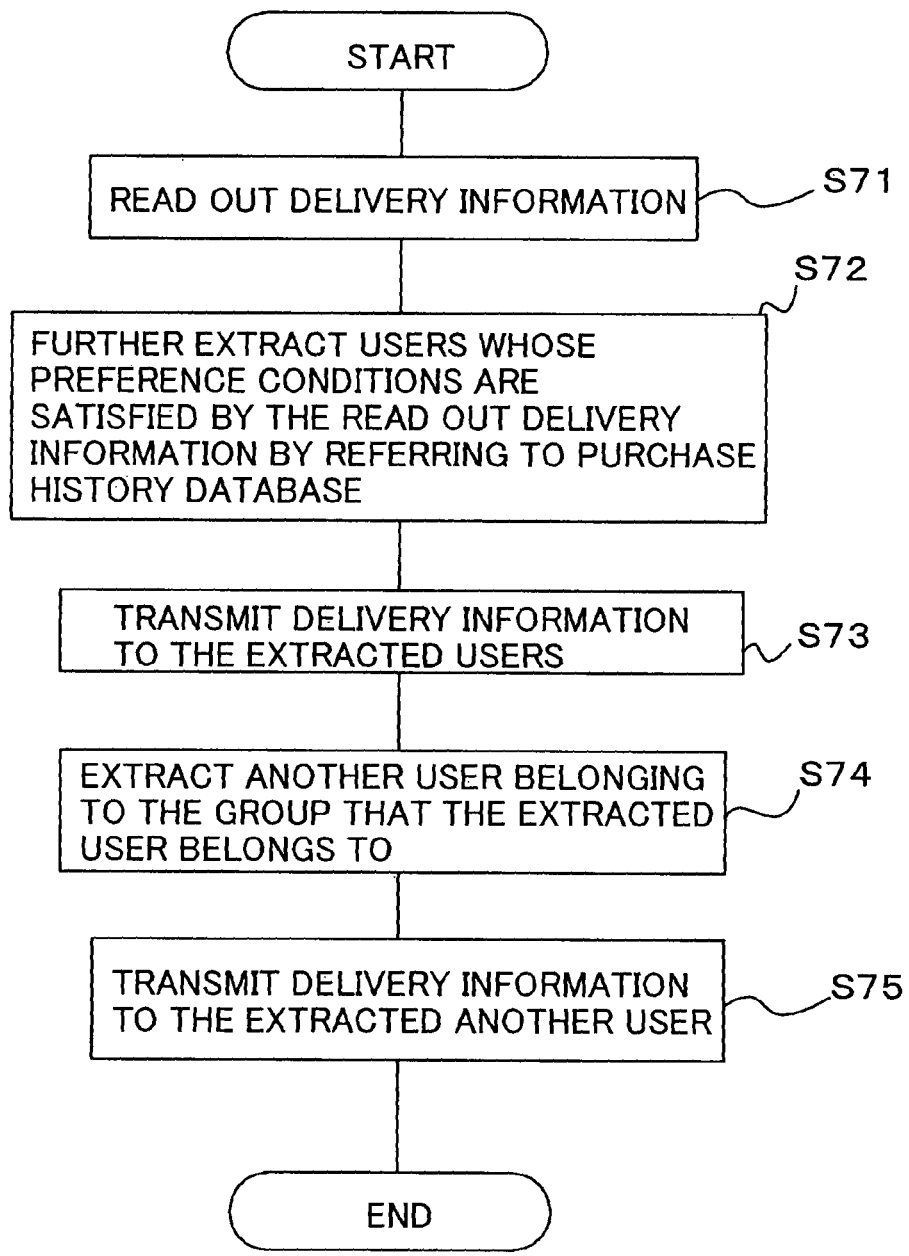

INFORMATION DELIVERY APPARATUS AND INFORMATION DELIVERY SYSTEM

TECHNICAL FIELD

The present invention relates to an information delivery system including mobile communication terminals and an information delivery apparatus that selectively delivers information to the mobile communication terminals via a communication network, and an information delivery apparatus to be used in this system.

BACKGROUND ART

Conventionally, information delivery services in which possible delivery information is selected for each user and unilaterally delivered to the user are carried out. By receiving delivery information delivered by this information delivery service, users of mobile communication terminals can obtain various information without accessing an information providing website, etc., and searching for and acquiring desired information. In addition, by selecting delivery information for each user and selectively delivering the delivery information, a situation where information unnecessary to users is delivered can be prevented in comparison with the case of delivering the delivery information without selection.

As an information delivery system for providing the information delivery service, for example, there is known a system described in Patent Document 1. In this system, based on current location information and past purchase history of each user, information that is considered to interest the corresponding user is selected from information concerning commercial goods available at a shop where the user is present and selectively delivered to the user. In this system, according to a current location of each user, information to be delivered to the corresponding user is narrowed, so that each user can receive only information concerning the location of the shop, etc. where the user currently stays. As a result, information concerning locations where the user is not staying is not delivered to each user.

Patent Document 1: Japanese Unexamined Patent Application Publication No. 2003-6512.

DISCLOSURE OF THE INVENTION

Problems to be Solved by the Invention

However, in the system described in Patent Document 1, unless a user actually visits a location relating to delivery information, the user cannot acquire the delivery information. Therefore, a user cannot acquire in advance the delivery information before visiting a location relating to the delivery information. As a result, for example, when information to be delivered to a user is on special sale information of items, if the user inadvertently does not have enough money when he/she visits this shop, a troublesome situation may arise that the user must leave the shop and go back for money and return to the shop again and purchase the item. When the information to be delivered to a user is information concerning an event that is held at present, even if the user visits the event site and acquires information concerning the event, the user may not have time to join the event.

In the system described in Patent Document 1, selection of information to be delivered to mobile communication terminals is performed based on preference information of users of the mobile communication terminals. Therefore, it is not possible that a user of the mobile communication terminal acquires information selected based on other users' preference information. However, if a system enabling acquisition of information selected based on other users' preference information is realized, it becomes possible to provide a novel information providing service to users.

An object of the present invention is to provide an information delivery system and an information delivery apparatus enabling acquisition of delivery information before a user goes to a location relating to the delivery information.

Another object of the present invention is to provide an information delivery system and an information delivery apparatus capable of realizing a novel information providing service which delivers a user with delivery information selected based on other users' information.

Means for Solving the Problem

According to an aspect of the present invention, an information delivery apparatus which selectively delivers information to mobile communication terminals via a communication network includes: delivery information memory means for memorizing delivery information that is planned to be delivered; location history information memory means for memorizing location history information showing locations where a mobile communication terminal was located in the past; preference identification information memory means for memorizing preference identification information for identifying preferences of a user of the mobile communication terminal; delivery information selecting means for selecting delivery information to be transmitted to the mobile communication terminal according to selection conditions determined from location history information read out from the location history information memory means and preference identification information read out from the preference identification information memory means; and information transmitting means for transmitting delivery information selected by the delivery information selecting means to the mobile communication terminal.

According to a more preferred aspect of the information delivery apparatus, location history information memorized in the location history information memory means is associated with time information showing times when the mobile communication terminal is located at locations indicated by the location history information, the information delivery apparatus includes activity pattern extracting means for extracting an activity pattern of the user of the mobile communication terminal based on location history information associated with time information showing times in a predetermined period by reading out the location history information from the location history information memory means; and movement time recognition means for recognizing a time when the mobile communication terminal is expected to move to the delivery information-related location concerning delivery information selected by the delivery information selecting means, and the information transmitting means transmits the delivery information to the mobile communication terminal at a predetermined time before the time recognized by the movement time recognition means.

Another more preferred aspect of the information delivery apparatus includes: transmission timing determining means for determining a timing of transmission of the delivery information by the information transmitting means according to contents of the delivery information, wherein the information transmitting means transmits the delivery information at a transmission timing determined by the transmission timing determining means.

According to still another more preferred aspect of the information delivery apparatus, the information transmitting means transmits delivery information selected by the delivery information selecting means to another mobile communication terminal instead of to the mobile communication terminal.

Still another more preferred aspect of the information delivery apparatus includes: group identification information memory means for memorizing group identification information for identifying a group that a plurality of mobile communication terminals belong to, wherein the information transmitting means reads out group identification information that the mobile communication terminal belongs to from the group identification information memory means and transmits delivery information selected by the delivery information selecting means to another mobile communication terminal belonging to the group identified from the group identification information.

Still another more preferred aspect of the information delivery apparatus includes: purchase and provision history information acquiring means for acquiring purchase and provision history information for identifying an item that the user purchased or a service that the user was provided with; and purchase and provision history information storage means for storing purchase and provision history information acquired by the purchase and provision history information acquiring means as the preference identification information in the preference identification information memory means.

Still another more preferred aspect of the information delivery apparatus includes: selection condition correcting means for correcting the selection conditions based on determination results by performing the determination as to whether an item or service concerning purchase and provision history information acquired by the purchase and provision history information acquiring means concerns delivery information that was transmitted by the information transmitting means in the past.

Still another more preferred aspect of the information delivery apparatus includes: delivery desired information acquiring means for acquiring delivery desired information for identifying delivery information that the user desires to have delivered; and delivery desired information storage means for storing the delivery desired information acquired by the delivery desired information acquiring means as the preference identification information in the preference identification information memory means.

According to another aspect of the present invention, an information delivery apparatus which selectively delivers information to mobile communication terminals via a communication network includes: delivery information memory means for memorizing delivery information planned to be delivered; location history information memory means for memorizing location history information showing locations where a mobile communication terminal was located in the past; delivery information selecting means for selecting delivery information to be transmitted according to selection conditions that are determined from location history information concerning the mobile communication terminal memorized in the location history information memory means among delivery information memorized in the delivery information memory means; and information transmitting means for transmitting delivery information selected by the delivery information selecting means to another mobile communication terminal different from the mobile communication terminal.

A more preferred aspect of the information delivery apparatus includes: group identification information memory means for memorizing group identification information for identifying a group that a plurality of mobile communication terminals belong to, wherein the information transmitting means reads out group identification information concerning a group that the mobile communication terminal belongs to from the group identification information memory means, and transmits delivery information selected by the delivery information selecting means to another mobile communication terminal belonging to the group identified from the group identification information.

Another more preferred aspect of the information delivery apparatus includes: location history information receiving and storing means for receiving the location history information transmitted from the mobile communication terminal via the communication network and storing the information in the location history information memory means.

According to still another more preferred aspect of the information delivery apparatus, the delivery information selecting means extracts a movement expected region where the mobile communication terminal is expected to move to according to predetermined movement expected region extraction conditions based on location history information read out from the location history information memory means, and selects delivery information to be transmitted to the mobile communication terminal, provided that the delivery information concerns a location within the extracted movement expected region as the selection conditions.

According to still another aspect of the present invention, an information delivery apparatus which selectively delivers information to mobile communication terminals via a communication network includes: delivery information memory means for memorizing delivery information planned to be delivered; preference identification information memory means for memorizing preference identification information for identifying preferences of a user of a mobile communication terminal; delivery information selecting means for selecting delivery information to be transmitted according to selection conditions determined from preference identification information concerning the user memorized in the preference identification information memory means among delivery information memorized in the delivery information memory means; and information transmitting means for transmitting delivery information selected by the delivery information selecting means to another mobile communication terminal different from the mobile communication terminal.

A more preferred aspect of the information delivery apparatus includes: group identification information memory means for memorizing group identification information for identifying a group that a plurality of mobile communication terminals belong to, wherein the information transmitting means reads out group identification information concerning a group that the mobile communication terminal belongs to from the group identification information memory means and transmits delivery information selected by the delivery information selecting means to another mobile communication terminal belonging to the group identified from the group identification information.

Another more preferred aspect of the information delivery apparatus includes: purchase and provision history information acquiring means for acquiring purchase and provision history information for identifying an item that the user purchased or a service that the user was provided with; and purchase and provision history information storage means for storing the purchase and provision history information acquired by the purchase and provision history information acquiring means as the preference identification information in the preference identification information memory means.

Still another more preferred aspect of the information delivery apparatus includes: selection condition correcting means for correcting the selection conditions based on determination results by performing the determination as to whether an item or service concerning purchase and provision history information acquired by the purchase and provision history information acquiring means concerns delivery information that was transmitted from the information transmitting means in the past.

Still another more preferred aspect of the information delivery apparatus includes: delivery desired information acquiring means for acquiring delivery desired information for identifying delivery information that the user desires to be delivered; and delivery desired information storage means for storing delivery desired information acquired by the delivery desired information acquiring means as the preference identification information in the preference identification information memory means.

Still another more preferred aspect of the information delivery apparatus includes: transmission timing determining means for determining a transmission timing of the delivery information to be transmitted by the information transmitting means according to contents of the delivery information, wherein the information transmitting means transmits the delivery information at a transmission timing determined by the transmission timing determining means.

According to still another aspect of the present invention, an information delivery apparatus which selectively delivers information to mobile communication terminals via a communication network includes: delivery information memory means for memorizing delivery information planned to be delivered; location history information memory means for memorizing location history information showing locations where a mobile communication terminal was located in the past; delivery information selecting means for selecting delivery information to be transmitted to the mobile communication terminal, provided that the information concerns a location within a movement expected region, by extracting the movement expected region where the mobile communication terminal is expected to move to according to predetermined movement expected region extraction conditions based on the location history information read out from the location history information memory means; and information transmitting means for transmitting delivery information selected by the delivery information selecting means to the mobile communication terminal.

According to still another aspect of the present invention, an information delivery system including mobile communication terminals and an information delivery apparatus that selectively delivers information to mobile communication terminals via a communication network, wherein as the information delivery apparatus, any one of the above-described information delivery apparatuses is used.

In an information delivery apparatus according to an aspect of the present invention, according to selection conditions determined from location history information indicating locations where a mobile communication terminal was located in the past, delivery information to be transmitted to the mobile communication terminal is selected. If such location history information is available, activities of a user thereof can be expected from the location history information. Therefore, delivery information consistent with the user's activity expectation can be selectively delivered to the mobile communication terminal of the user. Therefore, delivery information relating to a location where the user is expected to go to can be delivered before the user actually goes to the location. In particular, the selection conditions are determined from not only the location history information but also preference identification information for identifying the preferences of the user of the mobile communication terminal that is the delivery destination, so that a situation where delivery information unnecessary to a user is delivered to the mobile communication terminal of the user can be suppressed.

In an information delivery apparatus according to another aspect of the present invention, delivery information to be delivered to a user who is delivered with information is selected according to selection conditions determined from location history information relating to other users' mobile communication terminals. Therefore, it becomes possible to deliver delivery information consistent with other users' activity expectations to the user of the mobile communication terminal to which information is to be delivered.

In an information delivery apparatus according to still another aspect of the present invention, delivery information to be delivered to a user who is delivered with information is selected according to selection conditions determined from other users' preference identification information. Therefore, it becomes possible to deliver delivery information consistent with other users' preferences to a user of a mobile communication terminal to be delivered with information.

Effect of the Invention

According to an aspect of the present invention, delivery information relating to a location where a user is expected to go to can be delivered before the user actually goes to the location, so that a beneficial effect can be obtained which enables the user to acquire the delivery information before the user goes to the location relating to the delivery information.

According to another aspect of the present invention, a beneficial effect is obtained which realizes a novel information providing service in which a user is delivered with delivery information consistent with other users' activity expectations.

According to still another aspect of the present invention, a beneficial effect is obtained which realizes a novel information providing service in which a user is delivered with delivery information consistent with other users' preferences.

BRIEF DESCRIPTION OF DRAWINGS

FIG. 1 is a schematic configuration diagram of an entire information delivery system according to a first embodiment.

FIG. 2 is a functional block diagram of an information providing server constituting the information delivery system.

FIG. 3 is a block diagram showing an example of hardware configuration of a mobile phone constituting the information delivery system.

FIG. 4 is a functional block diagram of the mobile phone.

FIG. 5 is a flowchart showing an example of operations for acquiring and transmitting location information in a mobile phone.

FIG. 6 is a flowchart of delivery information processing to be performed by the information providing server.

FIG. 7 is a schematic configuration diagram of an entire information delivery system according to a second embodiment.

FIG. 8 is a functional block diagram of a mobile phone constituting the information delivery system.

FIG. 9 is a functional block diagram of an information providing server constituting the information delivery system.

FIG. 10 is a flowchart of delivery information processing to be performed by the information providing server.

FIG. 11 is a functional block diagram of an information providing server in a first variation.

FIG. 12 is a flowchart of selection condition correction processing to be performed by the information providing server.

FIG. 13 is a flowchart of delivery information processing to be performed by an information providing server in a second variation.

FIG. 14 is a functional block diagram of an information providing server in a third embodiment.

FIG. 15 is a flowchart of delivery information processing to be performed by the information providing server.

FIG. 16 is a schematic configuration diagram of an entire information delivery system according to a fourth embodiment.

FIG. 17 is a functional block diagram of an information providing server constituting the information delivery system.

FIG. 18 is a flowchart of delivery information processing to be performed by the information providing server.

FIG. 19 is a schematic configuration diagram of an entire information delivery system according to a fifth embodiment.

FIG. 20 is a functional block diagram of an information providing server constituting the information delivery system.

FIG. 21 is a flowchart of delivery information processing to be performed by the information providing server.

BEST MODE FOR CARRYING OUT THE INVENTION

Hereinafter, embodiments of the present invention will be described with reference to the accompanying drawings.

First Embodiment

First, an embodiment (hereinafter, this embodiment will be referred to as "first embodiment") of the present invention applied to an information delivery system including a mobile phone as a mobile communication terminal and an information delivery apparatus which delivers information to the mobile phone will be described.

FIG. 1 is a schematic configuration diagram of an entire information delivery system according to the first embodiment. This information delivery system includes mobile phones 10, a mobile phone communication network 20 as a communication network, and an information providing server 30 as the information delivery apparatus connected to the mobile phone communication network 20. The mobile phone communication network 20 includes not only a base station 21 which directly performs wireless communication with the mobile phone 10 but also a switching equipment, an exclusive line, a router, a firewall, etc., that are not shown. In this mobile phone communication network 20, a location registration server 40 is also provided as well as the information providing server 30. Each of the servers 30 and 40 may be composed of a single computer apparatus, or may be composed of a plurality of computers having a plurality of functions, respectively, connected to each other by a network.

The mobile phone 10 can acquire three kinds of location information including GPS (Global Positioning System) location information, area location information, and facility location information. The GPS location information is GPS location information (latitude, longitude, and altitude) indicating a current location of the mobile phone 10, and is calculated based on GPS signals that the mobile phone 10 received from GPS artificial satellites (hereinafter, referred to as "GPS satellites"). The area location information is area location information concerning a communication management area that the mobile phone 10 is located within, and is acquired by being received from the location registration server 40. This area location information is a cell ID for identifying a cell governed by the base station 21, a location of the base station 21, and identification information of the base station 21, etc. The facility location information is facility location information from which locations of various facilities such as a ticket gate of a station that a user can pass through or can stay. This facility location information can be acquired by communications between a communication terminal apparatus for use detection set in the facility and the mobile phone 10 when the user passes through or stays in the facility. In the example of FIG. 1, the case where the communication terminal apparatus is a ticket gate apparatus 70 of a station is shown. When a user positions the mobile phone 10 within a range in which the mobile phone 10 can communicate with a communication antenna 71 of the ticket gate apparatus 70 by approaching the ticket gate apparatus 70 or holding the mobile phone 10 over the communication antenna 71 of the ticket gate apparatus 70, authentication for use of the railway is performed by interactive communications between the ticket gate apparatus 70 and the mobile phone 10, whereby the user can pass through the ticket gate. By this communication, the mobile phone 10 can acquire facility location information indicating which ticket gates the user passed through to enter the station or exit from the station.

The information providing server 30 delivers various delivery information such as regional information, location information (latitude, longitude, and location) of the corresponding management area, and contents information, etc., by a predetermined communication channel from the base station 21 of each management area. The mobile phone 10 executes a receiving operation at a predetermined timing for a communication channel through which various delivery information are transmitted, whereby information transmitted via the communication channel can be acquired and stored in an internal memory. The receiving operations for each communication channel can be executed at timings set in advance at initial setting or timings set by the user.

In particular, for a communication channel through which location information of the management area is delivered, the receiving operation is executed at a timing when the power source of the mobile phone 10 is ON, at periodic timings set in advance at initial setting and at a timing of a change in management area in which the mobile phone 10 is located. By this receiving operation, each mobile phone 10 can always update the location information (latitude, longitude, and location) of a management area in which the corresponding mobile phone 10 is present to the latest information.

The information providing server 30 includes a location history database (location history information memory means) storing user information, various location information (location history information), and date and time information by associating these with each other. The information providing server 30 receives data of various location information transmitted from the mobile phones 10 and accumulatively stores the data in the location history database. The information providing server 30 selects delivery information to be transmitted to the mobile phones 10 of the respective users for each mobile phone based on various location information memorized in the location history database, and executes processing for delivering the selected delivery information to the mobile phones of the respective users. Details of a method for selecting the information will be described later.

The location registration server 40 is a server which registers and manages information concerning current locations of the respective mobile phones 10, that is, location information of management areas in which the mobile phones 10 are located. This management area may be an area consisting of one cell governed by the base station 21 that wirelessly communicates with the mobile phones, or may be an area including a plurality of cells adjacent to each other governed as one group. A typical size of one management area is several kilometers through several hundred meters. The location registration of the mobile phones 10 on the location registration server 40 is performed when the power sources of the mobile phones are ON, periodically and each timing when the cells in which the mobile phones 10 are located change.

FIG. 2 is a functional block diagram showing the relationship among means constituting the information providing server 30. This information providing server 30 includes a system bus, a CPU, an internal memory such as a RAM or ROM, an external storage device constituted by a hard disk drive (HDD), an optical disk drive, etc., and a communication device for mobile phone communication network for communicating with each mobile phone 10. This information providing server 30 realizes various functions of location history information memory means 301, information receiving means 302, information storage means 303, preference identification information memory means 304, delivery information selecting means 305, information transmitting means 306, and delivery information memory means 307, etc., by executing predetermined programs on the hardware including a CPU, etc. The information receiving means 302 and the information storage means 303 function as location history information receiving and storing means, the information receiving means 302 also functions as delivery desired information acquiring means and the information storage means 303 also functions as delivery desired information storage means.

The location history information memory means 301 includes a CPU, an internal memory, and an external storage device, etc., and builds a location history database for memorizing and managing location history information indicating locations where the mobile phones 10 were located in the past.

Table 1 shows an example of a data table memorized in the location history information memory means 301. This data table shows an example of data of various location information received from a mobile phone 10 of a user memorized in association with date and time data for each user (UID: User ID). In this example, three kinds of location information including facility location information (information concerning the railway, line, station, and ticket gate), GPS location information and area location information (base station location) are memorized.

TABLE 1

| UID | Date | Time | Facility location information (railway, line, station, ticket gate) | GPS location information |  |  |  | Area location information (Address of base station) |
|-----|------|------|-----|-----|-----|-----|-----|-----|
|     |      |      |     | Latitude | Longitude | Altitude | Precision | |
| 1 | 2003 Nov. 21 | 10:01 | aaa railway, nnn line, XXX station, ooo ticket gate | — | — | — | — | xxx, ooo-ku, Tokyo |
| 1 | 2003 Nov. 21 | 10:17 | aaa railway, nnn line, YYY station, ppp ticket gate | — | — | — | — | xxx, ooo-ku, Tokyo |
| 1 | 2003 Nov. 21 | 10:20 | bbb subway, mmm line, YYY station, qqq ticket gate | — | — | — | — | xxx, ooo-ku, Tokyo |
| 1 | 2003 Nov. 21 | 10:37 | bbb subway, mmm line, ZZZ station, rrr ticket gate | — | — | — | — | xxx, ooo-ku, Tokyo |
| 1 | 2003 Nov. 21 | 10:47 | — | 34.xxxxxx | 135.yyyyyy | 38.7 | A | xxx, ooo-ku, Tokyo |
| 1 | 2003 Nov. 21 | 10:48 | — | 34.xxxxxx | 135.yyyyyy | 38.7 | A | xxx, ooo-ku, Tokyo |
| 1 | 2003 Nov. 21 | 10:49 | — | 34.xxxxxx | 135.yyyyyy | 38.7 | B | xxx, ooo-ku, Tokyo |
| 1 | 2003 Nov. 21 | 10:50 | — | — | — | — | — | xxx, ooo-ku, Tokyo |

The information receiving means 302 includes a communication device for a mobile phone communication network and a CPU, etc., and receives at least one of GPS location information, area location information, and facility location information acquired by each mobile phone 10 together with date and time information indicating the date and time of acquisition of the information from the mobile phones 10 via the mobile phone communication network 20.

Table 2 shows an example of data of facility location information that the information receiving means 302 receives from a mobile phone 10. This facility location information includes data on railway names, line names, station names, and ticket gates as facility location information acquired by the mobile phone 10 when a user passes through the ticket gates of the stations.

Table 3 shows an example of data of GPS location information and area location information that the information receiving means 302 receives from a mobile phone 10, and includes data on latitudes, longitudes, and altitudes as the GPS location information and data on locations of base stations as the area location information.

TABLE 2

| UID | Date | Time | Facility location information (railway, line, station, ticket gate) | Entry/Exit | Fare |
|---|---|---|---|---|---|
| 1 | 2003 Nov. 21 | 10:01 | aaa railway, nnn line, XXX station, ooo ticket gate | Entry | 130 |
| 1 | 2003 Nov. 21 | 10:17 | aaa railway, nnn line, YYY station, ppp ticket gate | Exit | 160 |
| 1 | 2003 Nov. 21 | 10:20 | bbb subway, mmm line, YYY station, qqq ticket gate | Entry | 160 |
| 1 | 2003 Nov. 21 | 10:37 | bbb subway, mmm line, ZZZ station, rrr ticket gate | Exit | 0 |

TABLE 3

| | | | GPS location information | | | | Area location information |
|---|---|---|---|---|---|---|---|
| UID | Date | Time | Latitude | Longitude | Altitude | Precision | (Address of base station) |
| 1 | 2003 Nov. 21 | 10:47 | 34.xxxxxx | 135.yyyyyy | 38.7 | A | Akasaka, Minato-ku, Tokyo |
| 1 | 2003 Nov. 21 | 10:48 | 34.xxxxxx | 135.yyyyyy | 38.7 | A | Roppongi, Minato-ku, Tokyo |
| 1 | 2003 Nov. 21 | 10:49 | 34.xxxxxx | 135.yyyyyy | 38.7 | B | Roppongi, Minato-ku, Tokyo |
| 1 | 2003 Nov. 21 | 10:50 | — | — | — | — | Roppongi, Minato-ku, Tokyo |

The information receiving means 302 receives delivery desired information for identifying delivery information desired to be delivered by a user of each mobile phone 10 from each mobile phone 10 or other communication terminals such as personal computers via the mobile phone communication network 20. This delivery desired information is used by the information providing server 30 as preference identification information for identifying preferences of the corresponding user. Delivered information desired to be delivered by the user can be identified from this delivery desired information, so that this delivery information can be regarded as consistent with the user's preference. As the delivery desired information, for example, information concerning a desire for delivery of only information relating foods, information concerning a desire for delivery of only information relating events, combination of these information, etc. are used.

The information storage means 303 is composed of a CPU, etc., and additionally stores user identification information for identifying a user, at least one of the GPS location information, area location information and facility location information received by the information receiving means 302, and date and time information indicating date and time of acquisition of the information in the location history information memory means 301, by associating these with each other.

Furthermore, the information storage means 303 stores delivery desired information received by the information receiving means 302 in the preference identification information memory means 304 by associating the information with the user identification information.

The preference identification information 304 is composed of a CPU, an internal memory, and an external storage device, etc., and builds a delivery desired information database for memorizing and managing delivery desired information from the mobile phones 10.

The delivery information selecting means 305 selects delivery information to be transmitted to the mobile phones 10 of the respective users for each user from delivery information memorized in the delivery information memory means 307 according to selection conditions determined from the various location information memorized in the location history information memory means 301 and the delivery desired information memorized in the preference identification information memory means 304. More specifically, among delivery information memorized in the delivery information memory means 307, the delivery information selecting means 305 selects delivery information consistent with the delivery desired information of information selected based on various location information, etc., or selects information selected based on various location information from the delivery information consistent with the delivery desired information.

The information transmitting means 306 is composed of a communication device for a mobile phone communication network and a CPU, etc., and transmits delivery information selected by the delivery information selecting means 305 to each mobile phone 10 via the mobile phone communication network 20.

The delivery information memory means 307 is composed of a CPU, an internal memory, and an external storage device, etc., and memorizes and manages delivery information that is planned to be delivered. Delivery information memorized in this delivery information memory means 307 includes various information that is considered useful for users such as weather forecast information, special sale information of shops and sales facilities, information of new items, opening information of new shops, information concerning events to be held in event facilities, and job information. However, the delivery information in the first embodiment is location-related information including location information concerning the delivery information. This location information shows a location of the weather which is forecasted from weather forecast information when the delivery information is the weather forecast information, and shows a location where items or services concerning special sales information are provided when the delivery information is the special sale information. For example, when the delivery information is new item information, the location information shows a location where the new item is sold, when the delivery information is opening information of a new shop, the location information shows the location of the new shop, and when the delivery information is event information, the location information shows a location of an event facility in which the event is held. When the delivery information is job information, the location information shows a location of a company, etc., of job information.

FIG. 3 is a block diagram showing an example of hardware configuration of the mobile phone 10 that is used in this embodiment. This mobile phone 10 includes a control unit 111, an internal memory 112, a wireless communication unit 113 as communication means, and an antenna 114. To the control unit 111, a microphone 116 as voice input means and a speaker 117 as voice output means are connected via a voice processor 115, a display unit 119 is connected via an image processor 118, and furthermore, a key operation unit 120 is connected. This mobile phone 10 includes a clock unit 125 as timer means, a GPS receiver 130 as GPS location information acquiring means and an antenna 131 thereof, and a short-range wireless communication unit 140 as facility location information acquiring means 140 and an antenna 141 thereof.

The control unit 111 is composed of, for example, a CPU, a cash memory, and a system bus, etc., and exchanges data with the internal memory 112 and the wireless communication unit 113, etc., and controls the respective units by executing a predetermined control program.

The internal memory 112 is composed of, for example, a semiconductor memory such as a RAM or ROM, and memorizes control programs to be executed by the control unit 111 and various data.

The wireless communication unit 114 is controlled by the control unit 111, and wirelessly communicates with the base station 21 of the mobile phone communication network 20 via the antenna 114 by a predetermined transmission method. By this wireless communication, voice telecommunication with a specific mobile phone, etc., can be performed, electronic mail can be transmitted and received, and data communications for receiving information transmitted from the information providing server 30 can be performed.

The voice processor 115 encodes a transmitting voice signal inputted from the microphone 116 by a predetermined method and sends the encoded signal to the control unit 111. This voice processor 115 decodes a receiving voice signal received by the wireless communication unit 113 and outputs the decoded signal from the speaker 117.

The image processor 118 processes image data received by the wireless communication unit 113 and image data such as an icon or a menu, etc., memorized in the internal memory 112 and displays these on the display unit 119 composed of a liquid crystal display (LCD), etc.

The key operation unit 120 includes data input keys (numeric keypad, * key, and # key), a call start key, a call termination key, a scroll key, and a multifunction key, etc., and is used for telephone calling and receiving and scrolling and selecting of information displayed on the display unit 119.

The clock unit 125 is composed of a clock circuit, etc., and counts precise time of day and outputs data on date and time. The output of this clock unit 125 is used when acquiring location information of the mobile phone 10 and used as date and time information to be stored together with the location information.

The GPS receiver 130 receives radio waves from a plurality of GPS satellites 60 arranged around the earth and calculates data on a latitude, a longitude, and an altitude of the position of the mobile phone 10 based on the received results. The CPU receiver 130 is composed of, for example, a filter which extracts target frequency components from the received radio wave signals, a decoding circuit for extracting GPS signals from the received signals of the predetermined frequency components, a memory that memorizes programs and code data to be used for signal decoding, and a control and arithmetic operation unit for controlling the respective units and calculating position information and precision information by decoding the GPS signals.

Four or more of the GPS satellites 60 (more than 24 satellites in total) are arranged for each of six orbital planes whose longitudes of ascending nodes at intervals of 60 degrees positioned at an altitude of approximately 20,000 kilometers above the earth, and orbits the earth in a period of 12 hours. Due to this orbiting movement, the same GPS satellite 60 reaches the same position at the same time, and at least 4 or more (normally, 5 or 6) GPS satellites 60 can be observed from any point on the earth, and the position information of the GPS satellites 60 is strictly managed at monitor stations at 5 positions on the earth. The GPS satellite 60 is equipped with an atomic clock (oscillator) of cesium (Cs) or rubidium (Rb), etc., and precise time is clocked. The frequency of the oscillator is 10.23 MHz, and the clock obtains the frequency by dividing it into $1/10$, and times of the respective GPS satellites are also precisely synchronized.

From the GPS satellite 60, a radio wave with two frequencies of 1575.42 MHz (L1) and 1227.60 MHz (L2) is repeatedly transmitted at intervals of approximately 1 ms. This radio wave is modulated by random number coding called pseudo random noise code with predetermined codes. When the mobile phone 10 receives this radio wave, it reads the contents of the signal by referring to codes corresponding to a random number table. Then, based on the codes and time data outputted from the clock unit of the mobile phone 10, the time difference between the time of radio wave emission from the GPS satellite 60 and the time of receiving by the mobile phone 10 is measured. Then, by multiplying this time difference by the radio wave propagation velocity, the distance (=propagation velocity multiplied by time difference) from the GPS satellite 60 to the mobile phone 10 is obtained. From the GPS satellite 60, precision information concerning the orbit is sent, so that the current position of the GPS 60 can be precisely known. Therefore, if the distance from the GPS satellite 60 is known, the position of the mobile phone 10 on a sphere whose radius is the calculated distance around the GPS satellite 60 can be known. If the mobile phone can receive radio waves from two GPS satellites 60, two spheres are obtained, and the position of the mobile phone 10 is somewhere on the circumference at which the two spheres intersect with each other. If the mobile phone can receive radio waves from three GPS satellites 60, either one of the two intersections of the three spheres is the position of the mobile phone 10. One of the two intersections is far away from an expected position and can be discarded, so that one point is determined in principle.

However, in actuality, the solution of the calculation (intersections of three spheres) does not become two points due to a measurement error. Most of the measurement errors are due to the precision of the clock installed in the mobile phone 10. The clock of the GPS satellites 60 is an atomic clock, however, the precision of the clock installed in the mobile phone 10 is more inferior to that of the atomic clock. Therefore, a great error occurs in the calculated value of the time difference. Therefore, in the GPS, from one more GPS satellite, that is, from the fourth GPS satellite, a radio wave is received. This can be considered as follows. That is, when three XYZ unknown numbers are calculated from information (equation) of three GPS satellites, this calculation that could not be solved due to another unknown number of an error in the clock in the mobile phone 10 on the receiving side, is solved by introducing new information (equation). By receiving radio waves from four GPS satellites, in the GPS, a substantially precise position converged to one point can be obtained. Remaining errors are errors included in information from the GPS satellites and errors caused by turbulence of the atmosphere occurring until the radio waves reach the mobile phone 10 from the GPS satellites. Concerning the former information from the GPS satellites, an operation for adding the error called S/A (Selective Availability) was intentionally performed for private use at the beginning, however, this was abandoned in May, 2000, and at present, anybody can acquire information with fewer errors. From the GPS satellites, data for correcting delay of the latter error caused by the ionosphere is also transmitted, and in the mobile phone 10 on the receiving side, the error can be corrected by receiving the radio wave with two frequencies. This is because it is known that the radio wave propagation delay due to the ionosphere is in inverse proportion to the frequency.

The GPS receiver 130 calculates and outputs the data of location information (latitude, longitude, and altitude) of the thus corrected mobile phone.

The GPS positioning precision as precision information of the GPS location information can be expressed by "DOP (Dilution of Precision)" or "2 drms (2 multiplied by distance root means square)," etc. The DOP is also called "precision deterioration rate," and is a value as an index of deterioration in GPS positioning precision. The smaller the DPS value is, the higher the precision. As described above, the GPS positioning is normally performed by four or more GPS satellites, and the positioning precision is greatly influenced by the arrangement of the GPS satellites in this case. The DOP value is determined according to the arrangement of the GPS satellites. For example, when the GPS satellites are equally scattered and positioned, the DOP value becomes small and the GPS positioning precision becomes high, and on the other hand, when the GPS satellites are deflected to one point, the DOP value becomes large and the GPS positioning precision becomes low.

The DOP value can be calculated by the following expression. Herein, l, m, and n in the expression indicate direction cosines in directions of the respective coordinate axes x, y, and z of a unit length vector from the measuring point on the earth to the GPS satellite. k indicates the number of visible GPS satellites. 2σ indicates a magnification factor of an error toward each subscript.

[Numerical expression 1]

$$(G^T G)^{-1} = \left( \begin{bmatrix} l_1 & l_2 & l_3 & \dots & l_k \\ m_1 & m_2 & m_3 & \dots & m_k \\ n_1 & n_2 & n_3 & \dots & n_k \\ 1 & 1 & 1 & \dots & 1 \end{bmatrix} \begin{bmatrix} l_1 & m_1 & n_1 & 1 \\ l_2 & m_2 & n_2 & 1 \\ l_3 & m_3 & n_3 & 1 \\ \vdots & \vdots & \vdots & \vdots \\ l_k & m_k & n_k & 1 \end{bmatrix} \right) =$$

$$\begin{bmatrix} \sigma_{xx}^2 & \sigma_{xy}^2 & \sigma_{xz}^2 & \sigma_{xt}^2 \\ \sigma_{yx}^2 & \sigma_{yy}^2 & \sigma_{yz}^2 & \sigma_{yt}^2 \\ \sigma_{zx}^2 & \sigma_{zy}^2 & \sigma_{zz}^2 & \sigma_{zt}^2 \\ \sigma_{tx}^2 & \sigma_{ty}^2 & \sigma_{tz}^2 & \sigma_{tt}^2 \end{bmatrix}$$

In the case of 2 drm, the smaller the value is, the higher the precision. When one GPS receiver is set at one fixed location and positioning is continuously performed, a random range-finding error mixes in and one measuring point cannot be specified. 2 drms is a result of multiplication of this random error by two times of HDOP. Herein, it is said that 95% of all scattered measuring points fall within a circle with a radius of 2 rms around a true measuring point.

In this embodiment, the DOP value is used as precision information, and position precision in the case of a DOP value not more than 3 is indicated as "A" (good), and position precision in the case of a DOP value more than 3 is indicated as "B" (normal).

The GPS position measuring method described above is called "stand alone positioning" in which a position is independently calculated by only one GPS receiver (mobile phone). In order to further increase the measurement precision, it is also allowed that a correction value is calculated by an external receiver at a position different from a measuring point and an actual measured value is corrected based on the data of the correction value. This correction method is called "differential positioning (D-GPS)" in contrast with the "stand-alone positioning." As a detailed correction method, various methods can be used such as a method in which a phase of a carrier wave from the GPS satellite is calculated. The precision of "stand alone positioning" is approximately 10 meters, however, when correction is performed based on "differential positioning (D-GPS)," the precision can be increased to approximately 1 centimeter at maximum. In this case, as the external receiver, equipment (for example, base station) in the mobile phone communication network equipped with a GPS antenna may be used.

The short-range wireless communication unit 140 is composed by an IC card or an IC chip which can be detachably installed in or incorporated inside the mobile phone 10, and communicates with a communication terminal apparatus such as a ticket gate apparatus 70 set in various facilities according to a predetermined communication method. As the communication method, various methods can be employed. For example, a short-range wireless communication method using a radio wave of Bluetooth and a communication method using infrared ray, etc., can be employed. As the communication terminal apparatus as a communication target that the short-range wireless communication unit 140 will communicate with, as well as the ticket gate apparatus 70 shown in FIG. 1, a fare receiver and an entrance card reader set in a bus, a ticketing apparatus in a station or at an event site, an automatic cash dispenser in a financial facility, etc., a cash register in a shop, etc., and a base station of ETC on a highway, etc., are used.

FIG. 4 is a functional block diagram showing a relationship among means constituting the mobile phone 10 of this embodiment. The mobile phone 10 realizes functions of information memory means 101, GPS location information acquiring means 102, area location information acquiring means 103, facility location information acquiring means 104, information storage means 105, information transmitting means 106, information receiving means 107, information processing means 108, and information notification means 109 by executing predetermined programs on the hardware shown in FIG. 3.

The information memory means 101 is composed of an internal memory 112, etc., and memorizes various information such as the GPS location information, area location information, and facility location information, etc., as shown in Table 2 and Table 3 above.

The GPS location information acquiring means 102 is composed of the control unit 111, the clock unit 125, the GPS receiver 130, the antenna 131, etc., and receives radio waves from the GPS satellites 60 and acquires GPS location information based on the radio wave received results.

The area location information acquiring means 103 is composed of the control unit 111, the clock unit 125, the wireless communication unit 113, and the antenna 114, etc., and acquires area location information such as a base station location or a cell ID concerning a communication management area in which the mobile phone 10 is within.

The facility location information acquiring means 104 is composed of the control unit 111, the clock unit 125, the short-range wireless communication unit 140, and the antenna 141, etc., and acquires facility location information which enables identification of a location of a facility from a communication terminal apparatus such as a ticket gate apparatus 70 by communicating with the communication terminal apparatus.

The information storage means 105 is composed of the control unit 111 and the clock unit 125, etc., and stores GPS location information acquired by the GPS location information acquiring means 102, area location information acquired by the area location information acquiring means 103, and facility location information acquired by the facility location information acquiring means 104 in the information memory means 101 by associating the information with date and time information showing the date and time of acquisition of the information.

The information transmitting means 106 is composed of the control unit 111, the clock unit 125, the wireless communication unit 113, and the antenna 114, etc., and transmits at least one of the GPS location information, area location information, and facility location information stored in the information memory means 101 together with the date and time information showing the date and time of acquisition of the information to the information providing server 30 via the mobile phone communication network 20.

The information receiving means 107 is composed of the control unit 111, the wireless communication unit 113, and the antenna 114, etc., and receives delivery information transmitted from the information providing server 30 via the mobile phone communication network 20.

The information processing means 108 is composed of the control unit 111 and the image processor 118, etc., and performs information processing for making the information notification means 109 to notify delivery information received by the information receiving means 107. When the delivery information includes voice, the information processing means 108 is further composed of the voice processor 115.

The information notification means 109 is composed of the display unit 119, etc., and notifies delivery information by displaying a screen based on the delivery information on the display unit 119. When the delivery information includes voice, the information notification means 109 is further composed of the speaker 117.

FIG. 5 is a flowchart showing an example of operations for acquiring and transmitting location information in the mobile phone 10 with the foregoing configuration. A service for transmitting location information of the mobile phones 10 of users to the information providing server 30 and managing these is provided in a state that an approval for use of this service was received in advance from the users.

In FIG. 5, the mobile phone operates as follows when the location information acquiring and transmitting mode is selected after the power source of the mobile phone 10 is turned ON. First, it is determined by priority whether the mobile phone communicated with the communication terminal apparatus such as the ticket gate apparatus 70 is fixedly arranged in various facilities (S1). Herein, when the mobile phone is communicated with the communication terminal apparatus, facility location information received from the communication terminal apparatus by the communication is stored in the internal memory 112 and transmitted to the information providing server 30 (S2).

Next, it is determined whether the current time is timing of acquisition of GPS location information (S3). For example, predetermined time intervals (for example, intervals of 1 minute) are set as GPS location information acquisition timing, and it is determined whether the time data outputted from the clock unit 125 has reached the acquisition timing. When the current time is the GPS location information acquisition timing, based on the output of the GPS receiver 130 constituting the GPS location information acquiring means 102, it is determined whether the mobile phone is in a state capable of receiving the radio waves from the GPS satellites 60 at a predetermined intensity (S4).

Herein, when it is determined that the mobile phone is in a state capable of receiving the radio waves from the GPS satellites 60 at a predetermined intensity, it calculates and acquires GPS location information (latitude, longitude, and altitude) based on the radio wave received signals received from the GPS satellites 60, stores these in the internal memory 112, and transmits these to the information providing server 30 (S6).

On the other hand, when it is determined that the mobile phone is not in a state capable of receiving radio waves from the GPS satellites 60 at a predetermined intensity, the mobile phone does not perform acquisition of the GPS location information, and acquires area location information (base station address) by the area location information acquiring means 103, stores the information in the internal memory 112, and transmits the information to the information providing server 30 (S7).

Although the mobile phone 10 could acquire GPS location information, if the mobile phone 10 is out of the communication range and cannot communicate with the information providing server 30 when transmitting the GPS location information to the information providing server 30, the process waits until the mobile phone 10 enters the communication range and communications between the mobile phone 10 and the information providing server 30 become possible, and at the time when the communications become possible, the mobile phone 10 transmits the GPS location information. Similarly, also when the mobile phone 10 transmits the area location information and date and time information other than the GPS location information to another apparatus such as the information providing server 30, if the mobile phone is in a state not capable of communicating with the apparatus when transmitting the information, the mobile phone waits until it becomes possible to communicate with the apparatus, and at a timing when the mobile phone becomes possible to communicate with the apparatus, the mobile phone transmits the information.

In the example of FIG. 5, each time various location information is acquired and stored, each location information is transmitted to the information providing server 30, however, it is also allowed that acquisition and storage of various location information is successively repeated a plurality of times during a predetermined period of time, and then a plurality of location information is transmitted to the information providing server 30 at one time. In this case, in comparison with transmission each time of acquisition and storage of each location information, an increase in transmission load can be further suppressed.

Next, delivery information processing in the information providing server 30 as a feature of the present invention will be described. In the information providing service of the information providing system of the first embodiment, delivery information to be transmitted to a mobile phone 10 is selected and delivered according to selection conditions determined from location history information showing history of past location information of the mobile phone 10 of the user and preference identification information for identifying the user's preference. Location history information and preference identification information of a mobile phone 10 of a user may correspond to personal information of the user, so that it is necessary to receive approval for use of the location history information and the preference identification information of the mobile phone of the user in advance from the user who will use this service.

FIG. 6 is a flowchart of delivery information processing to be performed by the information providing server 30. First, the delivery information selecting means 305 of the information providing server 30 reads out delivery information memorized in the delivery information memory means 307 (S11), and extracts location information from the delivery information (S12). Next, the delivery information selecting means 305 extracts users who have repeatedly visited the location indicated by the extracted location information or the neighborhood thereof by referring to the location history information memory means (location history database) 30 (S13). More specifically, as described above, in the location history information memory means 301, location history information of the respective users is individually memorized on a user basis. The delivery information selecting means 305 reads out user identification information of users whose facility location information, GPS location information, and area location information corresponding to the location indicated by the location information extracted at S12 or the neighborhood thereof are plurally memorized with different times.

After users are thus extracted, the delivery information selecting means 305 reads delivery desired information corresponding to the user identification information of the users extracted at S13 from the preference identification information memory means (delivery desired information database) 304 (S14). Then, users whose delivery desired information is consistent with the delivery information are further extracted (S15). More specifically, the information selecting means 305 determines whether the delivery information is consistent with the readout delivery desired information of users, and extracts only users whose delivery desired information is determined to be consistent with the delivery information. Thereby, the delivery information selecting means 305 narrows the delivery targets to be delivered with the delivery information to users who have repeatedly visited the location indicated by the location information contained in the delivery information and desire delivery of the delivery information. Then, the delivery information selecting means 305 transmits the delivery information to the information transmitting means 306, and the delivery information is transmitted to only the thus narrowed users (S16). That is, the delivery information is not transmitted to other users.

The time when the information providing server 30 performs the foregoing delivery information processing, that is, the delivery information transmission timing may be individually determined according to the contents of the delivery information. For example, if the delivery information is weather forecast information, the transmission timing may be set to a day before the day the weather of which is forecasted in the weather forecast information, or for example, if the delivery information is special sale information, the timing may be set to a day before the day on which an item or service concerning the special sale information is provided, or to the special sale day. In this case, the function of transmission timing determining means for determining the transmission timing for transmitting the delivery information from the information transmitting means 306 according to the contents of the delivery information is realized by the CPU, etc., of the information providing server 30.

As described above, according to the first embodiment, each user can acquire only delivery information concerning locations where the user frequently visits or the neighborhoods. Thereby, delivery information concerning locations unrelated to the user such as locations where the user has not frequently visited or has not visited at all is prevented from being delivered to the mobile phone 10 of the user.

Herein, when delivery information concerning locations where the user frequently visits are all delivered regardless of the contents or kinds of the delivery information, information that the user is not interested in may be included in the information delivered to the user. However, in the first embodiment, from each user, delivery desired information (user's preference identification information) for identifying delivery information which the user desires to be delivered is acquired in advance, and only delivery information consistent with the delivery desired information are delivered to the mobile phone 10 of the user. Therefore, in the first embodiment, only delivery information which concerns the locations where the user frequently visits and are consistent with the user's preference (information that the user is interested in) is delivered to the mobile phone 10 of the user.

In the first embodiment, it is described that users who have repeatedly visited a location concerning delivery information are extracted and users whose delivery desired information is consistent with the delivery information are further extracted, however, it is also allowed that users whose delivery desired information is consistent with the delivery information are extracted and then users who have repeatedly visited the location concerning the delivery information are further extracted.

The first embodiment is focused on the delivery information, and describes that users to whom the delivery information is delivered are selected, and this is equivalent to selection of delivery information to be delivered to each user if each user is focused on.

Furthermore, in the first embodiment, GPS location information acquiring means 102 is provided in the mobile phone 10 to acquire precise location information of the mobile phone 10, however, it is also allowed that at least either one of the area location information or the facility location information is used. In this case, it becomes unnecessary to provide the GPS location information acquiring means 102 in the mobile phone 10. Even in the case where only the area location information is used, a ballpark location of the mobile phone 10 can be grasped from the location address of a corresponding base station. In particular, if the communication management area of the corresponding base station is very narrow, the location of the mobile phone 10 can be considerably precisely grasped. For example, in the case where an indoor base station is provided on each floor of a building, it can be grasped which floor the mobile phone 10 is located on. When an indoor base station is provided in each station of a railway, it can be grasped which station the mobile phone 10 is located in.

On the other hand, as in this embodiment, by providing the mobile phone 10 with the GPS location information acquiring means 102, and providing at least either one of the area location information acquiring means 103 or facility location information acquiring means 104, both precision and stability can be realized while the respective means complement each other in acquisition of location information of the mobile phone 10. More specifically, for example, at a location where GPS positioning is possible, the GPS location information acquiring means 102 acquires precise location information of the mobile phone 10, and at a location such as underground, where the mobile phone 10 cannot receive the radio waves from the GPS satellites at a predetermined intensity and the GPS positioning is difficult, either one of the area location information acquiring means 103 or the facility location information acquiring means 104 is used to acquire precise location information of the mobile phone 10.

Second Embodiment

Next, another embodiment (hereinafter, referred to as "second embodiment") of the present invention applied to an information delivery system including mobile phones 10 and an information providing server 30 that delivers information to the mobile phones will be described.

FIG. 7 is a schematic configuration diagram of the entire information delivery system according to the second embodiment. FIG. 8 is a functional block diagram showing a relationship among means constituting the mobile phone 10 of the second embodiment.

The hardware configuration of the mobile phone 10 of the second embodiment is similar to that of the first embodiment. However, as shown in FIG. 8, purchase information acquiring means 110 realized by executing a predetermined program on the hardware shown in FIG. 3 is added to the mobile phone 10 of the second embodiment.

The purchase information acquiring means 110 is composed of the control unit 111, the clock unit 125, the short-range wireless communication unit 140, and the antenna 141, etc., and performs fee payment by communicating with a communication terminal apparatus for payment 80 installed in a cash register of a commercial facility such as a department store or a convenience store shown in FIG. 7. More specifically, when the user locates his/her mobile phone 10 in a range enabling communications with a communication antenna 81 of the communication terminal apparatus for payment 80 by holding the mobile phone 10 over the communication antenna 81 of the communication terminal apparatus for payment 80, authentication for payment is executed by interactive communications between the communication terminal apparatus for payment 80 and the mobile phone 10. Then, after the authentication is successfully completed, fee data of a fee that the user should pay is transmitted from the communication terminal apparatus for payment 80 to the mobile phone 10. When this fee data is received by the mobile phone 10, an amount corresponding to the fee data is subtracted from electronic money data charged in the mobile phone 10.

Herein, in the second embodiment, information concerning an item purchased by the fee payment is transmitted from the communication terminal apparatus for payment 80 to the mobile phone 10. When this information is received by the purchase information acquiring means 110 of the mobile phone 10, the information storage means 105 stores the item information as purchase and provision history information in the information memory means 101 by associating the information with date and time information showing the date and time of acquisition of the information. Then, in the mobile phone 10 of the second embodiment, the information transmitting means 106 transmits the purchase and provision history information stored in the information memory means 101 to the information providing server 30 together with the date and time information showing the date and time of acquisition of the information via the mobile phone communication network 20.

The method of payment for purchasing an item is not limited to the above-described electronic money payment method as long as the information concerning the item that the user purchased can be stored in the information memory means 101 of the mobile phone 10.

FIG. 9 is a functional block diagram showing the relationship of the respective means constituting the information providing server 30 of the second embodiment. In this information providing server 30, the preference identification information memory means of the information providing server of the first embodiment stores not the delivery desired information but the purchase and provision history information. The information receiving means 302 also functions as the purchase and provision history information acquiring means, and the information storage means 303 also functions as the purchase and provision history information storage means.

The preference identification information memory means 304 is composed of a CPU, an internal memory, and an external storage device, etc., and builds a purchase history database for memorizing and managing purchase and provision history information showing items that the users of the respective mobile phones 10 purchased in the past. In the second embodiment, the purchase and provision history information is item information showing purchased items; however, this may be service information showing provided services.

The information receiving means 302 receives purchase and provision history information memorized in the information memory means 101 of each mobile phone 10 from each mobile phone 10 via the mobile phone communication network 20 instead of the delivery desired information in the first embodiment. This purchase and provision history information is used by the information providing server 30 as preference identification information for identifying the user's preference. From this purchase and provision history information, delivery information that the user desires to acquire can be estimated, so that the delivery information can be considered as consistent with the user's preference.

The information storage means 303 stores the purchase and provision history information received by the information receiving means 302 in the preference identification information memory means 304 by associating the information with user identification information of the user.

Similarly to the case of the first embodiment, the delivery information selecting means 305 selects delivery information to be transmitted to the mobile phone 10 of each user from delivery information memorized in the delivery information memory means 307 for each user according to selection conditions determined from various location information memorized in the location history information memory means 301 and purchase and provision history information memorized in the preference identification memory means 304. Herein, the selection conditions determined from the purchase and provision history information in the second embodiment are conditions (hereinafter, referred to as "preference conditions") for extracting items that the user repeatedly purchased and item category, etc., the purchase frequency of which is high. For example, when it is found from the purchase and provision history information that the user repeatedly purchased cosmetics of a specific brand, the preference conditions are, for example, information concerning cosmetic items of the specific brand. For example, when it is found from the purchase and provision history information that the user repeatedly purchased various confectionery, the preference conditions are information concerning the corresponding confectionery. In the second embodiment, from information selected based on various location information, etc., among delivery information memorized in the delivery information memory means 307, the delivery information selecting means 305 selects delivery information satisfying the preference conditions determined from the purchase and provision history information or select information selected based on the various location information from the delivery information satisfying the preference conditions.

Preference conditions of each user are determined at a predetermined timing by executing a predetermined program by the CPU, etc., of the information providing server 30, and the determined preference conditions are stored in advance in the preference identification information memory means 304 by being associated with user identification information of the corresponding user.

It is also allowed that the mobile phone 10 of each user determines preference conditions, and the information providing server 30 receives the information concerning the preference conditions and stores the information in the preference identification information memory means 304.

Next, delivery information processing of the information providing server 30 in the second embodiment will be described. The information delivery service of the information delivery system in the second embodiment is similar to that of the first embodiment except that purchase and provision history information showing history of items that the user purchased is used instead of the delivery desired information of the first embodiment. The purchase and provision history information of the user may correspond to personal information of the user, so that it is necessary to receive approval for use of the purchase and provision history information of the user in advance from the user.

FIG. 10 is a flowchart of delivery information processing to be performed by the information providing server 30. First, the delivery information selecting means 305 of the information providing server 30 reads out delivery information memorized in the delivery information memory means 307 in the same manner as in the first embodiment (S11), and extracts location information from the delivery information (S12). Next, the delivery information selecting means 305 extracts users who have repeatedly visited the location indicated by the extracted location information or the neighborhood thereof by referring to the location history information memory means (location history database) 301 (S13).

After thus extracting users, in the second embodiment, the delivery information selecting means 305 reads out preference conditions corresponding to user identification information of the users extracted at S13 from the preference identification information memory means (purchase history database) 304 (S21). Then, the delivery information selecting means 305 further extracts users whose preference conditions are satisfied by the delivery information (S22). More specifically, for each user, the delivery information selecting means 305 determines whether the delivery information satisfies the user's preference conditions, and extracts only users whose preference conditions are determined as being satisfied. Thereby, the delivery information selecting means 305 can narrow the delivery targets to be delivered with the delivery information to users who have repeatedly visited the location indicated by the location information included in the delivery information and whose preference conditions are satisfied by the delivery information. Then, the delivery information selecting means 305 sends the delivery information to the information transmitting means 306, and the delivery information is transmitted only to the thus narrowed users by the information transmitting means 306 (S16). That is, the delivery information is not transmitted to the other users.

The timings of the delivery information processing by the information providing server 30, that is, the transmission timings at which the information providing server 30 transmits the delivery information can be individually determined according to the contents of the delivery information is the same as in the first embodiment.

As described above, also in the second embodiment, each user can acquire only delivery information concerning locations where the user frequently visits. Thereby, delivery information concerning locations unrelated to the user such as locations where the user has not frequently visited or has not visited at all is prevented from being delivered to the mobile phone 10 of the user.

In addition, according to the second embodiment, purchase and provision history information (preference identification information) as information concerning items that each user purchased in the past is acquired in advance, and only delivery information satisfying selection conditions (preference conditions) determined from the user's purchase and provision history information are delivered to the mobile phone 10 of the user. Therefore, in the second embodiment, only delivery information which concerns locations where the user frequently visits and are consistent with the user's preference (information that the user is interested in) are delivered to the mobile phone 10 of the user.

In the second embodiment, it is described that the purchase and provision history information is used as preference identification information instead of the delivered desired information used in the first embodiment, however, both the delivery desired information and the purchase and provision history information may be used as preference identification information. In this case, it becomes possible to deliver delivery information more precisely consistent with the user's preference to the mobile phone 10 of the user.

In the second embodiment, users who have repeatedly visited a location concerning delivery information are extracted, and then users whose selection conditions are satisfied by the delivery information are further extracted, however, it is also allowed that users whose selection conditions are satisfied by the delivery information are extracted first, and then users who have repeatedly visited the location concerning the delivery information are further extracted.

In the second embodiment, the method for the information providing server 30 to acquire the information concerning items that the user purchased (purchase and provision history information) is not limited to the method in which the information is acquired from the mobile phone 10 as long as the information providing server 30 can acquire the information. That is, when purchasing an item, even if information concerning the item cannot be stored in the information memory means 101 of the mobile phone 10 and the item information cannot be transmitted from the mobile phone 10 to the information providing server 30, the same effect as in the second embodiment can be obtained.

For example, when an item is purchased by a conventional payment method in which coins and bills are handed over to a worker who is in charge of a cash register, it is only required that the information providing server 30 acquires information concerning the item inputted in the cash register via a communication network such as the Internet in a state that a user who purchased the item can be identified. For example, when an item is purchased by a credit card payment method, it is only required that the information providing server 30 acquires information concerning the item memorized in a management apparatus that the credit card company manages and operates via the communication network such as the Internet in a state that a user who purchased the item can be identified. In these cases, it is necessary to receive approval for use of purchase and provision history information of the user in advance from the user.

[First Variation]

Next, a variation of the second embodiment (hereinafter, this variation will be referred to as "first variation") will be described. The first variation relates to correction of preference conditions as one of the selection conditions for selecting delivery information to be delivered to the user. More specifically, it is determined whether an item indicated by purchase and provision history information acquired from the mobile phone 10 concerns delivery information that was delivered to the mobile phone 10 in the past, and based on the determination results, the preference conditions of the user of the mobile phone are corrected.

FIG. 11 is a functional block diagram showing the relationship among means constituting the information providing server 30 of the first variation. This information providing server 30 realizes the function of selection condition correcting means in addition to the means of the information providing server of the second embodiment by executing a predetermined program on the hardware composed of a CPU, etc.

The selection condition correcting means 308 is composed of a CPU, etc., and determines whether an item concerning purchase and provision history information that was acquired by the information receiving means 302 and stored in the preference identification information memory means 304 concerns delivery information that was transmitted from the information transmitting means 306 in the past.

Herein, in the first variation, as in the case of the second embodiment, delivery information is transmitted to extracted users (S11 through S16 of FIG. 10), and the first variation is different from the second embodiment in that item identification information for identifying the item concerning the delivery information is stored in the preference identification information memory means 304 by associating the information with user identification information of the extracted users.

FIG. 12 is a flowchart of selection condition correction processing to be performed by the information providing server 30 in the first variation. After purchase and provision history information that was acquired by the information receiving means 302 is stored in the preference identification information memory means 304 by the information storage means 303, the selection condition correcting means 308 of the information providing server 30 reads out the purchase and provision history information and user identification information associated with the purchase and provision history information from the preference identification information memory means 304 (S31). Then, the selection condition correcting means 308 recognizes the item concerning the readout purchase and provision history information (S32). Next, the selection condition correcting means 308 reads out item identification information associated with the user identification information from the preference identification information memory means 304 (S33). Then, the selection condition correcting means determines whether the item indicated by the readout item identification information includes an item that is consistent with the item recognized at S32 (S34).

In this determination, when it is determined no consistent item is included, the processing is directly ended. On the other hand, when any item is included, it can be supposed that the user purchased the item concerning the delivery information by looking at the delivery information delivered in the past, so that the delivery information can be considered as consistent with the user's preference. Therefore, in this case, the selection condition correcting means 308 resets the lifetime of the preference condition used when the delivery information was transmitted (S35). Herein, in the first variation, for each of the preference conditions memorized in the preference identification information memory means 304, a lifetime is set. That is, beyond the lifetime, the preference condition is deleted from the preference identification information memory means 304. Therefore, in the case of an item concerning delivery information delivered in the past is not purchased for a long period of time, the lifetime of the preference condition used when the delivery information was transmitted will expire soon. On the other hand, when an item concerning delivery information delivered in the past is purchased by the corresponding user and purchase and provision history information concerning the item is received by the information providing server 30, a lifetime of a preference condition used when the delivery information was transmitted is reset, and the preference condition will be used for selection of delivery information to be delivered to the user for a longer period of time.

As described above, according to the first variation, the preference condition as one of the selection conditions for the delivery information which was used by the user is continuously used, and a preference condition concerning delivery information which was not used by the user is deleted, and as a result, the consistency precision between the delivery information to be delivered to the user and the user's preference can be increased with time.

It is desirable that the lifetimes of the preference conditions are individually set according to the contents of the preference conditions.

[Second Variation]

Next, variations of the first and second embodiments (hereinafter, this variation will be referred to as "second variation") will be described. In the first and second embodiments, a location where a user frequently visits or the neighborhood thereof is recognized based on location information memorized in the location history information memory means 301, and delivery information concerning the location, etc., is selectively delivered to the user. On the other hand, in the second variation, a range of user's activities is recognized based on location information memorized in the location history information memory means 301, and delivery information concerning a location is delivered to the user if the location is within the range of the user's activities even if the user has not visited the location.

In the following description, a variation of the first embodiment will be described, and the variation of the second embodiment is the same.

FIG. 13 is a flowchart of delivery information processing to be performed by the information providing server 30 in the second embodiment. First, the delivery information selecting means 305 of the information providing server 30 reads out delivery information memorized in the delivery information memory means 307 in the same manner as in the first embodiment (S11). Then, in the second variation, users whose delivery desired information is consistent with the delivery information are extracted first (S14, S15). After thus extracting users, the delivery information selecting means 305 reads out location history information corresponding to user identification information of the users extracted at S15 from the location history information memory means (location history database) 301 (S41). Then, based on the readout location history information, the delivery information selecting means 305 derives a movement expected region in which the mobile phone of the user is expected to move according to predetermined movement expected region extraction conditions (S42). As movement expected region extraction conditions to be used for deriving the movement expected region, conditions necessary for expecting the region that the mobile phone of the user is expected to move within are used. In the second variation, past location distribution of the mobile phone 10 is obtained based on the readout location history information, and from the location distribution, the range of the user's activities is estimated. Then, this range of activities is derived as the movement expected region. That is, in the second variation, the predetermined movement expected region extraction conditions are to be consistent with the range of activities of the user obtained from the location history information.

After thus deriving the movement expected region, the delivery information selecting means 305 extracts location information from the delivery information read out from the delivery information memory means 307 in the same manner as in the first embodiment (S12). Then, users whose movement expected regions derived at S42 include the location indicated by the extracted location information or the neighborhood thereof are extracted (S43). Thereby, the delivery information selecting means 305 can narrow the delivery targets to be delivered with the delivery information to users whose ranges of activities (movement expected regions) include the location indicated by the location information included in the delivery information and desire delivery of the delivery information. Then, the delivery information is transmitted only to the thus narrowed users by the information transmitting means 306 (S16), and is not transmitted to the other users.

As described above, according to the second variation, each user can acquire only delivery information concerning locations within his/her range of activities. Thereby, delivery information concerning locations outside the range of activities and having no relation to the user are prevented from being delivered to the mobile phone 10 of the user. On the other hand, delivery information concerning a location is delivered to the user if the location is within the user's range of activities even if the user has not visited the location.

In the second embodiment, it is described that location history information is read out and a movement expected region is derived during information delivery processing, however, it is also allowed that a movement expected region is derived in advance at a predetermined timing before the information delivery processing, and information concerning the movement expected region is stored in the location history information memory means 301 by associating the information with user identification information of the corresponding user. In this case, processing for deriving the movement expected region by reading out location history information becomes unnecessary, and the information delivery processing can be made quicker.

In the second variation, it is described that users whose ranges of activities include a location concerning delivery information are extracted and then users whose delivery desired information is consistent with the delivery information are extracted, however, it is not always necessary to extract users whose delivery desired information is consistent with the delivery information. In this case, the processing for receiving the delivery desired information and memorizing the information in the preference identification information memory means 304 becomes unnecessary.

Third Embodiment

Next, still another embodiment (hereinafter, this embodiment will be referred to as "third embodiment") of the present invention applied to an information delivery system including mobile phones 10 and an information providing server 30 which delivers information to the mobile phones will be described.

In the first and second embodiments, locations where a user frequently visits or the neighborhood thereof are recognized based on location information memorized in the location history information memory means 301, and delivery information concerning the locations are selectively delivered to the user. On the other hand, in the third embodiment, an activity pattern of a user is extracted based on location history information memorized in the location history information memory means 301 and date and time information associated with the location history information, and it is estimated when and where the user goes to, and delivery information concerning the destination is delivered before a predetermined time when the user goes to the destination.

Hereinafter, based on the first embodiment, only differences from the first embodiment are described, however, the third embodiment can also be described in the same manner even based on the second embodiment.

FIG. 14 is a functional block diagram showing the relationship among means constituting the information providing server 30 of the third embodiment. This information providing server 30 realizes functions of activity pattern extracting means 309 and movement time recognition means 310 in addition to the means of the information providing server of the first embodiment by executing predetermined programs on the hardware composed of a CPU, etc.

The activity pattern extracting means 309 reads out location history information associated with the date and time information showing dates and times in a predetermined period of time from the location history information memory means 301, and extracts a user's activity pattern based on the readout location history information. Then, the activity pattern extracting means stores the extracted activity pattern in the location history information memory means 301 by associating the pattern with user identification information of the user. The activity pattern referred to herein is information which associates locations where the user repeatedly visited in the past with times, days, and months of the visits to the locations. Therefore, the activity pattern extracting means 309 extracts locations where the user repeatedly visited in the past from the location history information, and stores information that associates movement expected location information showing the locations with date and time information showing the times of visits to the locations as an activity pattern of the user in the location history information memory means 301.

Activity patterns of users are extracted by the activity pattern extracting means 309 at a predetermined time by executing a predetermined program by the CPU, etc., of the information providing server 30, and stored in the location history information memory means 301. However, it is also allowed that the mobile phone 10 of each user determines the user's activity pattern based on the location history information and the information providing server 30 receives the activity pattern and stores the pattern in the location history information memory means 301.

The movement time recognition means 310 recognizes a time when the corresponding user is expected to move to the location indicated by the location information (delivery information related location) included in the delivery information to be selected by the delivery information selecting means from the activity pattern memorized in the location history information memory means 301. The recognized time is sent to the information transmitting means 306 and temporarily stored in the information transmitting means 306.

Next, delivery information processing of the information providing server 30 in the third embodiment will be described.

FIG. 15 is a flowchart of delivery information processing to be performed by the information providing server 30. First, the delivery information selecting means 305 of the information providing server 30 reads out delivery information memorized in the delivery information memory means 307 in the same manner (S11) and extracts location information from the delivery information (S12), as in the first embodiment. Next, the delivery information selecting means 305 extracts users whose activity patterns include the location indicated by the extracted location information by referring to location history information memory means (location history database) 301 (S51). That is, users whose movement expected location information of the user's activity pattern is consistent with the extracted location information are extracted.

After thus extracting users, in the same manner as in the first embodiment, the delivery information selecting means 305 reads out delivery desired information corresponding to user identification information of the users extracted at S51 from the location history information memory means (location history database) 301 (S14). Then, users whose delivery desired information is consistent with the delivery information are further extracted (S15). Then, the delivery information selecting means 305 sends the delivery information to the information transmitting means 306.

On the other hand, after extracting users at S51, the delivery information selecting means 305 sends user identification information of the users and location information included in the delivery information to the movement time recognition means 310. The movement time recognition means 310 that received the information reads out activity patterns corresponding to the received user identification information from the location history information memory means 301, and based on the activity patterns, extracts date and time information associated with movement expected location information consistent with the received location information. Then, it extracts only information with periodicity from the extracted date and time information, and specifies movement expected dates and times at which the users are likely to go to the location indicated by the location information (S53). Then, among the specified movement expected dates and times, the movement time recognition means recognizes delivery scheduled time information showing times that are a predetermined time before the nearest dates and times in the future (S54), and sends the information to the information transmitting means 306.

In the present embodiment, in the delivery information processing, the movement time recognition means 310 specifies movement expected dates and times at which the users are likely to go to the location concerning the delivery information, however, the means may specify these in advance before the delivery information processing. In this case, for example, when the activity pattern extracting means 309 extracts activity patterns, the activity pattern extracting means 309 not only associates the movement expected location information indicating locations where the users repeatedly visited in the past with date and time information showing dates and times of the visits to the locations, but also specifies movement expected dates and times at which the users are likely to go to the locations from the date and time information and stores the movement expected dates and times by associating these with the movement expected location information showing the movement expected dates and times. Thereby, in the delivery information processing, the movement time recognition means 310 only recognizes delivery scheduled times based on information concerning movement expected times and dates included in the activity patterns and sends delivery scheduled time information showing the scheduled times to the information transmitting means 306.

The information transmitting means 306 that received the delivery scheduled time information does not transmit the delivery information received from the delivery information selecting means until the time reaches the date and time indicated by the delivery scheduled time information (S55). Then, when the time reaches the date and time shown by the delivery scheduled time information, the information transmitting means transmits the delivery information to the mobile phone 10 of the corresponding user (S16).

As described above, also in the third embodiment, as in the case of the first embodiment, each user can acquire only delivery information that concerns locations where the user frequently visits and are consistent with the user's preference.

In addition, according to the third embodiment, the delivery information is delivered a predetermined time before the time when the user is expected to visit the location concerning delivery information. Therefore, by properly setting the predetermined time, it becomes possible to deliver the delivery information at an appropriate timing for the user. The appropriate timing for delivering the delivery information changes depending on the contents of the delivery information, so that it is desirable that the predetermined time is determined according to the contents of the delivery information.

In the third embodiment, after users whose delivery desired information is consistent with delivery information are extracted, users whose activity patterns include a location concerning the delivery information are further extracted, however, it is also allowed that users whose activity patterns include the location concerning the delivery information are extracted and then users whose delivery desired information is consistent with the delivery information are further extracted.

In the third embodiment, users whose activity patterns include a location concerning delivery information are extracted and then users whose delivery desired information is consistent with the delivery information are further extracted, however, it is also allowed that users whose activity patterns include the location concerning the delivery information are only extracted. Even in this case, a useful effect is obtained such that delivery information concerning locations unrelated to the user such as locations where the user has not frequently visited or has not visited at all is prevented from being delivered to the mobile phone 10 of the user, and delivery information can be delivered to the user at an appropriate timing.

Fourth Embodiment

Next, still another embodiment (hereinafter, this embodiment will be referred to as "fourth embodiment") of the present invention applied to an information delivery system including mobile phones 10 and an information providing server 30 which delivers information to the mobile phones will be described.

The above-described first through third embodiments describe a case where information selected based on user's location history information and user's preference identification information (delivery desired information) are transmitted to the user, however, according to the fourth embodiment, information selected based on other users' location history information and other users' delivery desired information are transmitted to the user. An approval for transmission of delivery information selected based on location history information and delivery desired information of a user to other users in a group that the user belongs to must be received in advance from the user.

Hereinafter, based on the first embodiment, only differences from the first embodiment will be described, however, the fourth embodiment can be described in the same manner even based on the second embodiment.

FIG. 16 is a schematic configuration diagram of an entire information delivery system according to the fourth embodiment. FIG. 17 is a functional block diagram showing the relationship among means constituting an information providing server 30 of the fourth embodiment. This information providing server 30 realizes the function of group identification information memory means 311 in addition to the respective means of the information providing server of the first embodiment by executing predetermined programs on the hardware composed of a CPU, etc. This group identification information memory means 311 is composed of a CPU, an internal memory, and an external storage device, etc., and stores group identification information for identifying groups that users of the mobile phones 10 belong to by associating the group identification information with user identification information of the users who belong to the groups. In order to belong to a group, a user transmits a group registration request indicating that the user desires to belong to the group from the mobile phone 10 or another communication terminal to the information providing server 30 via the mobile phone communication network 20. This group registration request is received by the information receiving means 302, and the information storage means 303 stores user identification information of the user who transmitted the group registration request in the group identification information memory means 311 by associating the information with group identification information concerning the group registration request. Thereby, as described later, to the mobile phone 10 of this user, delivery information selected based on location history information and delivery desired information of the mobile phone 10 of another user belonging to the same group is transmitted.

Next, delivery information processing of the information providing server 30 in the fourth embodiment will be described.

FIG. 18 is a flowchart of delivery information processing performed by the information providing server 30. First, the delivery information selecting means 305 of the information providing server 30 extracts users who have repeatedly visited a location indicated by location information included in the delivery information and desire to be delivered with the delivery information (S11 through S15). Then, the delivery information selecting means 305 sends the delivery information and user identification information of the users to the information transmitting means 306. The information transmitting means 306 which received this delivery information and the user identification information transmits the delivery information to the users extracted at S15 in the same manner as in the first embodiment (S16). Thereafter, in the fourth embodiment, the information transmitting means 306 retrieves group identification information that the user identification information is associated with by referring to the group identification information memory means. Then, the information transmitting means 306 reads out another user identification information that the group identification information is associated with and extracts another user belonging to the groups (S61). Then, the delivery information is also transmitted to the extracted another user (S62).

At the time of this transmission, a name or nickname of the user concerning the location history information and the delivery desired information used for selecting the delivery information may be transmitted together. In this case, another user delivered with the delivery information can find out based on whose location history information the delivery information was selected.

As described above, according to the fourth embodiment, a user can acquire delivery information concerning locations where other users belonging to the same group frequently visit. Thereby, all of the users belonging to the same group can share information concerning a location where a specific person belonging to the same group frequently visits. Accordingly, for example, if friends register for the same group, information concerning a location where a specific person among the friends frequently visits can be shared by the friends.

In the fourth embodiment, it is described that delivery information selected based on location history information, etc., of a user is transmitted to the user himself/herself as well as among users belonging to the same group as that of the user, however, it is also possible that the delivery information concerning the user is not delivered to the user but is delivered to only other users belonging to the group.

In the fourth embodiment, it is described that user identification information of a user is stored by associating the information with group identification information according to a group registration request from the user, however, it is also possible that the user identification information of the user is stored by associating the information with group identification information according to predetermined group registration conditions without a group registration request from the user. For example, when the information providing server 30 acquires age information of a user, user identification information of the user may be stored by associating the information with the group identification information of a group that the age indicated by the age information belongs to among the respective groups previously sorted by age. In this case, the user can find out information concerning locations where other persons in the same age group frequently visit. Also in this case, a necessary approval for registration on the group, etc., must be received in advance from the user. Similarly, the groups may be divided by residing region based on each user's address information or may be divided by school based on information concerning schools that the users go to, or may be divided by a combination of these methods.

In the fourth embodiment, users who have repeatedly visited a location concerning the delivery information are extracted, and then users whose delivery desired information is consistent with the delivery information are further extracted, and the delivery information is transmitted to other users of a group that the extracted user belongs to, however, it is also possible that without extracting users whose delivery desired information is consistent with the delivery information, the delivery information is transmitted to other users of the group that the user who has repeatedly visited the location belongs to. In this case, the processing for receiving the delivery desired information and memorizing the information in the preference identification information memory means 304 is unnecessary.

The fourth embodiment is described based on the first embodiment, however, the fourth embodiment can be described in the same manner even based on the second embodiment and the first and second variations.

Fifth Embodiment

Next, still another embodiment (hereinafter, this embodiment will be referred to as "fifth embodiment") of the present invention applied to an information delivery system including mobile phones 10 and an information providing server 30 which delivers information to the mobile phones will be described.

The above-described fourth embodiment describes the case where information selected based on other users' location history information and other users' preference identification information is transmitted to the user, however, in the fifth embodiment, information selected according to selection conditions (preference conditions) determined from other users' preference identification information without using location history information is transmitted to the user. An approval must be received from the user for transmission of delivery information selected according to preference conditions determined from the user's preference identification information to other users in the group that the user belongs to.

FIG. 19 is a schematic configuration diagram of an entire information delivery system according to the fifth embodiment. FIG. 20 is a functional block diagram showing a relationship among means constituting the information providing server 30 of the fifth embodiment.

The basic configuration of the information providing server 30 of the fifth embodiment is similar to that of the second embodiment, however, it is different from the second embodiment in that users' location history information is not used and not received and the location history information memory means 301 is not included. An information providing server 30 of the fifth embodiment also realizes the function of group identification information memory means 311 by executing a predetermined program on the hardware composed of a CPU, etc. This group identification information memory means 311 is similar to that of the fourth embodiment, and group registration processing thereof is also similar to that of the fourth embodiment.

Next, delivery information processing of the information providing server 30 of the fifth embodiment will be described.

FIG. 21 is a flowchart of delivery information processing to be performed by the information providing server 30. First, the delivery information selecting means 305 of the information providing server 30 reads out delivery information memorized in the delivery information memory means 307 in the same manner as in the second embodiment (S71). Next, the delivery information selecting means 305 extracts users whose preference conditions are satisfied by the delivery information by referring to the preference identification information memory means (purchase history database) 304 (S72). More specifically, preference conditions determined based on purchase and provision history information of each user are memorized for each user in the purchase and provision history information memory means 304 as described in the second embodiment. The delivery information selecting means 305 determines whether the delivery information read out at S71 satisfies the preference conditions of the users, and reads out user identification information of only the users whose preferences are determined as being satisfied by the delivery information. Thereby, the delivery information selecting means 305 can extract only users whose preference conditions are satisfied by the delivery information. Then, the delivery information selecting means 305 sends the delivery information and the user identification information of the extracted users to the information transmitting means 306.

The information transmitting means 306 which received the delivery information and user identification information first transmits the delivery information to the users extracted at S72 in the same manner as in the fourth embodiment (S73). Thereafter, the information transmitting means 306 retrieves group identification information that the user identification information is associated with by referring to the group identification information memory means. Then, the information transmitting means 306 reads out other users' identification information associated with the group identification information and extracts other users belonging to the corresponding group (S74). Then, the delivery information is also transmitted to the extracted other users (S75). In this transmission, a name or nickname of the user concerning the delivery desired information used for selecting the delivery information may be transmitted together similarly to the case of the fourth embodiment.

As described above, according to the fifth embodiment, a user can acquire information satisfying preference conditions of other users belonging to the same group, that is, delivery information consistent with preferences of other users belonging to the same group (information that the users are interested in). Thereby, all users belonging to the same group can share information that a specific person belonging to the same group is interested in. Accordingly, for example, if friends register for the same group, the friends can share information that a specific person among the friends is interested in.

In the fifth embodiment, it is described that the purchase and provision history information is used as preference identification information; however, the same effect can be obtained even by using delivery desired information used in the first embodiment as the preference identification information instead.

The fifth embodiment may be changed similarly to the change described in the above-described second embodiment in that both delivery desired information and purchase and provision history information used in the first embodiment may be used as preference identification information instead of using only purchase and provision history information as the preference identification information as well as the changes in the first and second variations.

In addition, the fifth embodiment may be changed similarly to the change described in the above-described fourth embodiment in that the delivery information selected according to selection conditions of a user is not transmitted to the user but is transmitted only to other users belonging to the same group that the user belongs to.

As described above, in the information delivery systems described in the first through third embodiments, the information providing server 30 as an information delivery apparatus includes delivery information memory means 307 for memorizing delivery information planned to be delivered, location history information memory means 301 for memorizing location history information showing locations where mobile phones 10 as mobile communication terminals were located in the past, preference identification information memory means 304 for memorizing delivery desired information or purchase and provision history information as preference identification information for identifying preferences of users of the mobile phones 10, delivery information selecting means 305 for selecting delivery information to be transmitted to the mobile phones 10 according to selection conditions determined based on location history information read out from the location history information memory means 301 and delivery desired information or purchase and provision history information read out from the preference identification information memory means 304, and information transmitting means 306 for transmitting the delivery information selected by the delivery information selecting means 305 to the mobile phones 10.

If the information providing server 30 can acquire such location history information, it becomes possible to expect the corresponding user's activity from the location history information. Therefore, by properly setting the predetermined selection conditions, it becomes possible to selectively deliver delivery information consistent with the user's activity expectation to the mobile phone 10 of the user. Accordingly, delivery information concerning a location where the user is expected to go to can be delivered in advance before the user actually visits the location.

In addition, the selection conditions are determined based on preference identification information of a user of a mobile communication terminal as a delivery destination as well as based on the location history information. As described above, when all of the delivery information selected from only location history information of a user is delivered to the user regardless of the contents and kinds of the delivery information, the delivery information may include information that the user is not interested in, that is, information that is not consistent with the user's preference. The present information providing server 30 acquires in advance preference identification information of the user and narrows delivery information to be delivered to the user to delivery information consistent with the user's preference identification information, so that the frequency of delivery of information that the user is not interested in to the user can be reduced.

In the above-described information providing server 30 of the third embodiment, location history information to be memorized in the location history information memory means 301 is associated with time information showing times when the mobile phones 10 were located at locations indicated by the location history information, and the information providing server 30 includes activity pattern extracting means 309 for extracting activity patterns of users of the mobile phones 10 based on readout location history information that is associated with time information showing times in a predetermined period and read out from the location history information memory means 301, and movement time recognition means 310 for recognizing times when the mobile phones 10 are expected to move to the delivery information related locations concerning the delivery information selected by the delivery information selecting means 305 from the activity patterns extracted by the activity pattern extracting means 309, and the information transmitting means 306 transmits the delivery information to the corresponding mobile phones 10 a predetermined time before the time recognized by the movement time recognition means 310. Thereby, delivery information concerning the user's destination can be delivered a predetermined time before the time when the user is expected to go to the destination, so that by properly setting this predetermined time, delivery information can be delivered at a proper timing to the user.

In the information providing servers 30 of the fourth and fifth embodiments, the information transmitting means 306 transmits the delivery information selected by the delivery information selecting means 305 to another mobile phone 11 different from the mobile phone 10 of the user who relates to the location history information used for the selection. Thereby, a novel information providing service can be realized in which to the user of another mobile phone 11, delivery information selected based on location history information of any other user's mobile phone 10 is delivered.

In addition, the information providing servers 30 of the fourth and fifth embodiments include group identification information memory means 311 for memorizing group identification information for identifying a group that a plurality of mobile phones 10 belong to, and the information transmitting means 306 reads out group identification information that the mobile phones 10 belong to from the group identification information memory means 311, and transmits delivery information selected by the delivery information selecting means 305 to a group identified from the group identification information. Thereby, as described above, all users belonging to the group can share information concerning a location where a specific person among users belonging to the same group frequently visits.

In the above-described first, second, fourth, and fifth embodiments, as described in the first embodiment and the second embodiment, it is also possible that transmission timing determining means for determining transmission timing of the delivery information to be transmitted by the information transmitting means 306 according to contents of the delivery information is provided, and the information transmitting means 306 transmits the delivery information at the transmission timing determined by the transmission timing determining means. Thereby, the delivery information can be transmitted to the mobile phone of the user at an appropriate timing according to the contents of the delivery information.

The above-described information providing servers 30 of the second and fifth embodiments include purchase and provision history information acquiring means 302 for acquiring purchase and provision history information for identifying items that users of the mobile phones 10 purchased or services that the users were provided with, and purchase and provision history information storage means 303 for storing the purchase and provision history information acquired by the purchase and provision history information acquiring means 302 as the preference identification information in the purchase and provision history information memory means 304. Thereby, the operation for notifying the information providing server 30 of users' preference identification information from the user becomes unnecessary, and the convenience for the users is improved.

In particular, the information providing server 30 of the first variation includes selection condition correcting means 308 for correcting the selection conditions (preference conditions) based on determination results by performing the determination as to whether an item or service concerning the purchase and provision history information acquired by the purchase and provision history information acquiring means 302 concerns delivery information that the information transmitting means 306 transmitted in the past. Thereby, as described above, precision in consistency with the user's preference can be increased with time.

The information providing servers 30 of the first, third, and fourth embodiments described above may include delivery desired information acquiring means 302 for acquiring delivery desired information for identifying delivery information that the users of the mobile phones 10 desire to be delivered, and delivery desired information storage means for storing delivery desired information acquired by the delivery desired information acquiring means 302 as the preference identification information in the location history information memory means 301 as the preference identification information memory means. Thereby, it becomes possible to precisely grasp the users' preferences, and as a result, precision in consistency of delivery information to be delivered to the users with the users' preferences can be increased.

The above-described information providing servers 30 of the first through fourth embodiments includes location history information receiving and storing means 302 and 303 for receiving location history information transmitted via the mobile phone communication network 20 as a communication network from the mobile phones 10 and storing the information in the location history information memory means 301. Thereby, the information providing server 30 can observe the locations of the mobile phones 10 of the respective users, and in comparison with the case where the information providing server 30 manages and stores the location history information of the mobile phones 10, the information providing server can distribute the processing load to the respective mobile phones 10, so that the processing load on the information providing server 30 can be reduced.

In the information providing server 30 of the second variation, the delivery information selecting means 305 extracts movement expected regions to which the mobile phones 10 are expected to move according to predetermined movement expected region extraction conditions based on location history information read out from the location history information memory means 301, and selects delivery information to be transmitted to the mobile phones 10, provided that the delivery information concerns locations within the extracted movement expected regions. Thereby, as described above, each user can acquire only delivery information concerning locations within his/her range of activities (movement expected region), and delivery information concerning a location is delivered to the corresponding user if the location is within his/her range of activities even if the user has not visited the location.

In the above description, preference identification information is delivery desired information transmitted from users' mobile phones or purchase and provision history information of the users, however, other preference identification information can also be used as long as it is possible to identify objects that the users are interested in from the preference identification information. For example, it is also possible to identify objects that a user is interested in from information in a genre of news stories on a website that the user frequently browses, and such information can be used as preference identification information.

In the above description, the information delivery system for mobile phones is described, however, the present invention is also similarly applicable to an information delivery system for mobile communication terminals other than mobile phones.

The invention claimed is:

1. An information delivery apparatus that selectively delivers information to mobile communication terminals via a communication network, comprising:
    a delivery information memory device that stores delivery information that is planned to be delivered;
    a location history information memory device that stores location history information showing locations where a mobile communication terminal was located in the past;
    a preference identification information memory device that stores preference identification information for identifying preferences of a user of the mobile communication terminal;
    a delivery information selecting device that selects delivery information to be transmitted to the mobile communication terminal according to selection conditions determined from location history information read out from the location history information memory device and preference identification information read out from the preference identification information memory device;
    an information transmitting device that transmits delivery information selected by the delivery information selecting device to the mobile communication terminal, wherein the location history information stored in the location history information memory device is associated with time information showing times when the mobile communication terminal is located at locations indicated by the location history information;
    an activity pattern extracting device that extracts an activity pattern of the user of the mobile communication terminal based on the readout location history information associated with time information showing times in a predetermined period by reading out the location history information from the location history information memory device; and
    a movement time recognition device that recognizes a time when the mobile communication terminal is expected to move to the delivery information related location concerning delivery information selected by the delivery information selecting device, wherein the information transmitting device transmits the delivery information to the mobile communication terminal a predetermined time before the time recognized by the movement time recognition device.

2. The information delivery apparatus according to claim 1, further comprising:
    a transmission timing determining device that determines a timing of transmission of the delivery information by the information transmitting device according to contents of the delivery information, wherein the information transmitting device transmits the delivery information at a transmission timing determined by the transmission timing determining device.

3. The information delivery apparatus according to claim 1, wherein the information transmitting device transmits delivery information selected by the delivery information selecting device to another mobile communication terminal instead of to the mobile communication terminal.

4. The information delivery apparatus according to claim 3, further comprising:
    a group identification information memory device that stores group identification information for identifying a group that a plurality of mobile communication terminals belong to, wherein the information transmitting device reads out group identification information that the mobile communication terminal belongs to from the group identification information memory device and transmits delivery information selected by the delivery information selecting device to another mobile communication terminal belonging to the group identified from the group identification information.

5. The information delivery apparatus according to claim 1, further comprising:
    a purchase and provision history information acquiring device that acquires purchase and provision history information for identifying an item that the user purchased or a service that the user was provided with; and
    a purchase and provision history information storage device that stores purchase and provision history information acquired by the purchase and provision history information acquiring device as the preference identification information in the preference identification information memory device.

6. The information delivery apparatus according to claim 5, further comprising:
    a selection condition correcting device that corrects the selection conditions based on determination results by performing the determination as to whether an item or service concerning purchase and provision history information acquired by the purchase and provision history information acquiring device concerns delivery information that was transmitted by the information transmitting device in the past.

7. The information delivery apparatus according to claim 1, further comprising:
- a delivery desired information acquiring device that acquires delivery desired information for identifying delivery information that the user desires to be delivered; and
- a delivery desired information storage device that stores delivery desired information acquired by the delivery desired information acquiring device as the preference identification information in the preference identification information memory device.

8. The information delivery apparatus according to claim 1, further comprising:
- a location history information receiving and storing device that receives the location history information transmitted from the mobile communication terminal via the communication network and storing the information in the location history information memory device.

9. The information delivery apparatus according to claim 1, wherein the delivery information selecting device extracts a movement expected region where the mobile communication terminal is expected to move to according to predetermined movement expected region extraction conditions based on location history information read out from the location history information memory device, and selects delivery information to be transmitted to the mobile communication terminal, provided that the delivery information concerns a location within the extracted movement expected region as the selection conditions.

10. An information delivery apparatus that selectively delivers information to mobile communication terminals via a communication network, comprising:
- a delivery information memory device that stores delivery information planned to be delivered;
- a preference identification information memory device that stores preference identification information for identifying preferences of a user of a mobile communication terminal;
- a delivery information selecting device that selects delivery information to be transmitted according to selection conditions determined from preference identification information concerning the user stored in the preference identification information memory device among delivery information stored in the delivery information memory device;
- an information transmitting device that transmits delivery information selected by the delivery information selecting device to another mobile communication terminal different from the mobile communication terminal;
- a group identification information memory device that stores group identification information for identifying a group that a plurality of mobile communication terminals belong to, wherein the information transmitting device reads out group identification information concerning a group that the mobile communication terminal belongs to from the group identification information memory device and transmits delivery information selected by the delivery information selecting device to another mobile communication terminal belonging to the group identified from the group identification information;
- a purchase and provision history information acquiring device that acquires purchase and provision history information for identifying an item that the user purchased or a service that the user was provided with;
- a purchase and provision history information storage device that stores purchase and provision history information acquired by the purchase and provision history information acquiring device as the preference identification information in the preference identification information memory device; and
- a selection condition correcting device that corrects the selection conditions based on determination results by performing the determination as to whether an item or service concerning purchase and provision history information acquired by the purchase and provision history information acquiring device concerns delivery information that was transmitted from the information transmitting device in the past.

11. The information delivery apparatus according to claim 10, further comprising:
- a delivery desired information acquiring device that acquires delivery desired information for identifying delivery information that the user desires to be delivered; and
- a delivery desired information storage device that stores delivery desired information acquired by the delivery desired information acquiring device as the preference identification information in the preference identification information memory device.

12. The information delivery apparatus according to claim 10, further comprising:
- a transmission timing determining device that determines a transmission timing of the delivery information to be transmitted by the information transmitting device according to contents of the delivery information, wherein the information transmitting device transmits the delivery information at a transmission timing determined by the transmission timing determining device.

13. An information delivery system, comprising:
mobile communication terminals; and
an information delivery apparatus that selectively delivers information to the mobile communication terminals via a communication network, wherein the information delivery apparatus includes:
- a delivery information memory device that stores delivery information that is planned to be delivered;
- a location history information memory device that stores location history information showing locations where a mobile communication terminal was located in the past;
- a preference identification information memory device that stores preference identification information for identifying preferences of a user of the mobile communication terminal;
- a delivery information selecting device that selects delivery information to be transmitted to the mobile communication terminal according to selection conditions determined from location history information read out from the location history information memory device and preference identification information read out from the preference identification information memory device; and
- an information transmitting device that transmits delivery information selected by the delivery information selecting device to the mobile communication terminal, wherein the location history information stored in the location history information memory device is associated with time information showing times when the mobile communication terminal is located at locations indicated by the location history information;
- an activity pattern extracting device that extracts an activity pattern of the user of the mobile communication terminal based on the readout location history information associated with time information showing times in a predetermined period by reading out the location history information from the location history information memory device; and a movement time recognition device that recognizes a time when the mobile communication terminal is expected to move to the delivery information related location concerning delivery information selected by the delivery information selecting device, wherein the information transmitting device transmits the delivery information to the mobile communication terminal a predetermined time before the time recognized by the movement time recognition device.

14. An information delivery apparatus that selectively delivers information to mobile communication terminals via a communication network, comprising:

a delivery information memory device that stores delivery information that is planned to be delivered;

a location history information memory device that stores location history information showing locations where a mobile communication terminal was located in the past;

a preference identification information memory device that stores preference identification information for identifying preferences of a user of the mobile communication terminal;

a delivery information selecting device that selects delivery information to be transmitted to the mobile communication terminal according to selection conditions determined from location history information read out from the location history information memory device and preference identification information read out from the preference identification information memory device;

an information transmitting device that transmits delivery information selected by the delivery information selecting device to the mobile communication terminal;

a transmission timing determining device that determines a timing of transmission of the delivery information by the information transmitting device according to contents of the delivery information, wherein the information transmitting device transmits the delivery information at a transmission timing determined by the transmission timing determining device wherein the information transmitting device transmits delivery information selected by the delivery information selecting device to another mobile communication terminal instead of to the mobile communication terminal;

a group identification information memory device that stores group identification information for identifying a group that a plurality of mobile communication terminals belong to, wherein the information transmitting device reads out group identification information that the mobile communication terminal belongs to from the group identification information memory device and transmits delivery information selected by the delivery information selecting device to another mobile communication terminal belonging to the group identified from the group identification information;

a purchase and provision history information acquiring device that acquires purchase and provision history information for identifying an item that the user purchased or a service that the user was provided with;

a purchase and provision history information storage device that stores purchase and provision history information acquired by the purchase and provision history information acquiring device as the preference identification information in the preference identification information memory device; and a selection condition correcting device that corrects the selection conditions based on determination results by performing the determination as to whether an item or service concerning purchase and provision history information acquired by the purchase and provision history information acquiring device concerns delivery information that was transmitted by the information transmitting device in the past.

15. An information delivery apparatus that selectively delivers information to mobile communication terminals via a communication network, comprising:

a delivery information memory device that stores delivery information that is planned to be delivered;

a location history information memory device that stores location history information showing locations where a mobile communication terminal was located in the past;

a preference identification information memory device that stores preference identification information for identifying preferences of a user of the mobile communication terminal;

a delivery information selecting device that selects delivery information to be transmitted to the mobile communication terminal according to selection conditions determined from location history information read out from the location history information memory device and preference identification information read out from the preference identification information memory device;

an information transmitting device that transmits delivery information selected by the delivery information selecting device to the mobile communication terminal;

a transmission timing determining device that determines a timing of transmission of the delivery information by the information transmitting device according to contents of the delivery information, wherein the information transmitting device transmits the delivery information at a transmission timing determined by the transmission timing determining device, and wherein the information transmitting device transmits delivery information selected by the delivery information selecting device to another mobile communication terminal instead of to the mobile communication terminal;

a group identification information memory device that stores group identification information for identifying a group that a plurality of mobile communication terminals belong to, wherein the information transmitting device reads out group identification information that the mobile communication terminal belongs to from the group identification information memory device and transmits delivery information selected by the delivery information selecting device to another mobile communication terminal belonging to the group identified from the group identification information;

a purchase and provision history information acquiring device that acquires purchase and provision history information for identifying an item that the user purchased or a service that the user was provided with;

a delivery desired information acquiring device that acquires delivery desired information for identifying delivery information that the user desires to be delivered; and a delivery desired information storage device that stores delivery desired information acquired by the delivery desired information acquiring device as the preference identification information in the preference identification information memory device.

16. An information delivery apparatus that selectively delivers information to mobile communication terminals via a communication network, comprising:

a delivery information memory device that stores delivery information that is planned to be delivered;

a location history information memory device that stores location history information showing locations where a mobile communication terminal was located in the past;

a delivery information selecting device that selects delivery information to be transmitted according to selection conditions that are determined from location history information concerning the mobile communication terminal memorized in the location history information memory device among delivery information memorized in the delivery information memory device;

an information transmitting device that transmits delivery information selected by the delivery information selecting device to another mobile communication terminal different from the mobile communication terminal;

a group identification information memory device that stores group identification information for identifying a group that a plurality of mobile communication terminals belong to, wherein the information transmitting device reads out group identification information concerning a group that the mobile communication terminal belongs to from the group identification information memory device, and transmits delivery information selected by the delivery information selecting device to another mobile communication terminal belonging to the group identified from the group identification information; and a location history information receiving and storing device that receives the location history information transmitted from the mobile communication terminal via the communication network and storing the information in the location history information memory device, wherein the delivery information selecting device extracts a movement expected region where the mobile communication terminal is expected to move to according to predetermined movement expected region extraction conditions based on location history information read out from the location history information memory device, and selects delivery information to be transmitted to the mobile communication terminal, provided that the delivery information concerns a location within the extracted movement expected region as the selection conditions.

17. The information delivery apparatus according to claim 16, further comprising:

a transmission timing determining device that determines a transmission timing of the delivery information to be transmitted by the information transmitting device according to contents of the delivery information, wherein the information transmitting device transmits the delivery information at a transmission timing determined by the transmission timing determining device.

* * * * *